(12) United States Patent
Kitade

(10) Patent No.: US 12,487,295 B2
(45) Date of Patent: Dec. 2, 2025

(54) MAGNETISM DETECTION DEVICE

(71) Applicant: ROHM CO., LTD., Kyoto (JP)

(72) Inventor: Tetsuya Kitade, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 140 days.

(21) Appl. No.: 18/421,269

(22) Filed: Jan. 24, 2024

(65) Prior Publication Data
US 2024/0302458 A1 Sep. 12, 2024

(30) Foreign Application Priority Data
Mar. 6, 2023 (JP) .................................. 2023-033612

(51) Int. Cl.
*G01R 33/07* (2006.01)

(52) U.S. Cl.
CPC .................................... *G01R 33/07* (2013.01)

(58) Field of Classification Search
CPC .. G01R 33/07; G01R 33/0017; G01R 33/007; G01R 33/0011; G01R 33/0005; G01R 33/0047; G01R 33/0094; G01R 33/02; G01R 33/075; G01R 33/077; G01R 33/09; G01R 33/072; G01R 15/202; G01R 15/205; G01R 15/20
See application file for complete search history.

(56) References Cited

U.S. PATENT DOCUMENTS

| | | | | |
|---|---|---|---|---|
| 2007/0290682 | A1* | 12/2007 | Oohira | H10N 52/101 257/E43.003 |
| 2015/0130453 | A1* | 5/2015 | Obana | G01R 33/0017 324/225 |
| 2016/0187433 | A1* | 6/2016 | Nishimura | G01R 33/0354 324/252 |
| 2018/0166624 | A1* | 6/2018 | Kigoshi | H10N 52/101 |
| 2018/0329001 | A1* | 11/2018 | Tanigawa | G01R 33/063 |

FOREIGN PATENT DOCUMENTS

JP    2019144037 A    8/2019

* cited by examiner

*Primary Examiner* — Alvaro E Fortich
(74) *Attorney, Agent, or Firm* — HSML P.C.

(57) ABSTRACT

A magnetism detection device includes: a substrate having a substrate front surface; a magnetism detection element provided at the substrate front surface; a first terminal and a second terminal arranged at positions on the substrate front surface separated from the magnetism detection element; and a front surface wiring formed over the substrate front surface and configured to electrically connect the first terminal and the second terminal, wherein the front surface wiring includes: a first wiring applying a magnetic field including a first direction component along a thickness direction of the substrate to the magnetism detection element when a current flows from the first terminal to the second terminal; and a second wiring applying a magnetic field including a second direction component, which is in an opposite direction of the first direction component, to the magnetism detection element when the current flows from the first terminal to the second terminal.

20 Claims, 17 Drawing Sheets

MAGNETISM DETECTION DEVICE

CROSS-REFERENCE TO RELATED APPLICATION

This application is based upon and claims the benefit of priority from Japanese Patent Application No. 2023-033612, filed on Mar. 6, 2023, the entire contents of which are incorporated herein by reference.

TECHNICAL FIELD

The present disclosure relates to a magnetism detection device.

BACKGROUND

In the related art, as an example of a magnetism detection device, a configuration including a substrate and a magnetism detector provided on the substrate is known.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
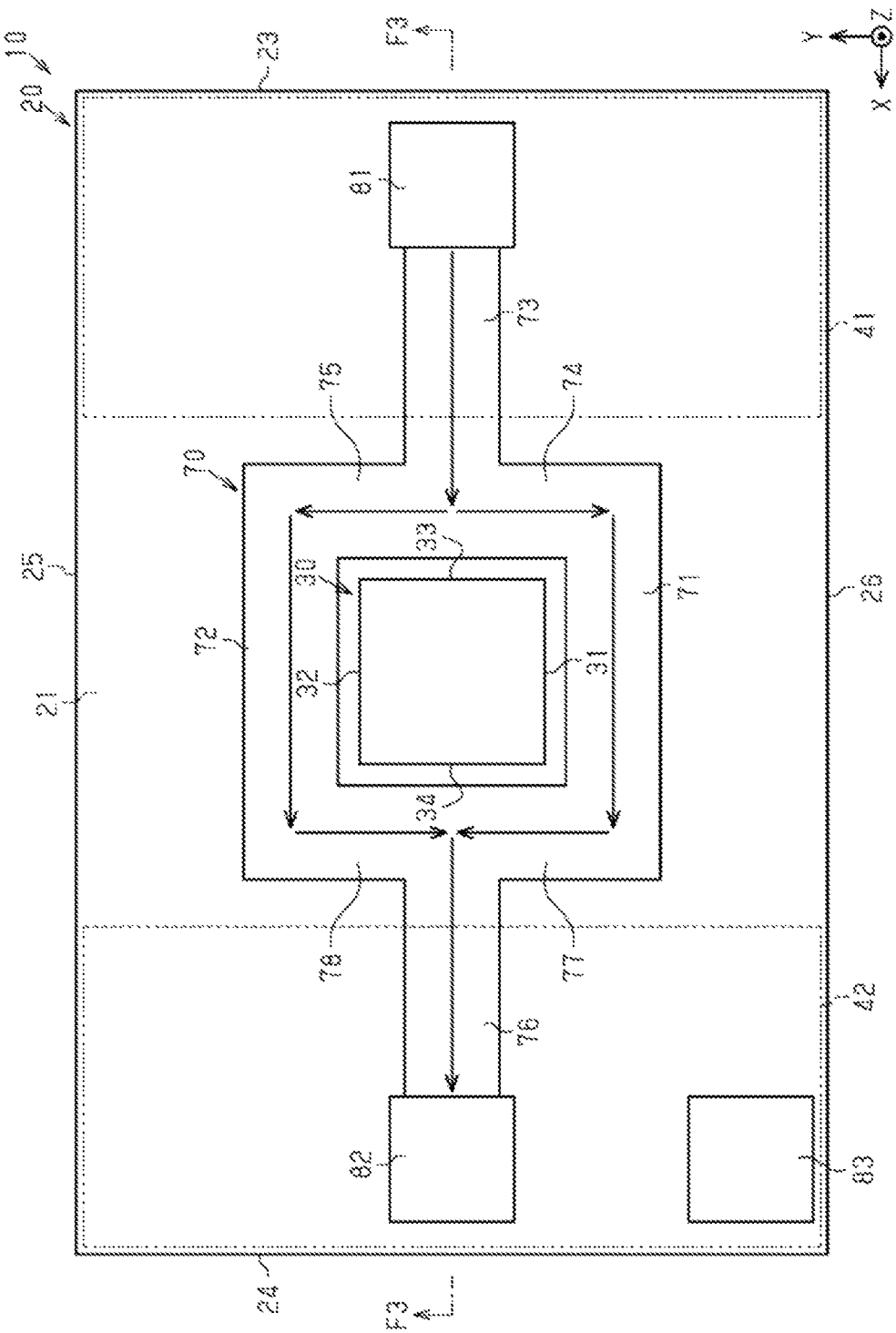
FIG. 1 is a schematic plan view of a magnetism detection device according to a first embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, several embodiments of a magnetism detection apparatus according to the present disclosure will be described with reference to the accompanying drawings. It should be noted that, for simplicity and clarity of explanation, components shown in the drawings are not necessarily drawn to scale. Further, in order to facilitate understanding, hatching lines may be omitted in cross-sectional views. The accompanying drawings merely illustrate embodiments of the present disclosure and should not be considered as limiting the present disclosure.

The following detailed description includes devices, systems, and methods embodying exemplary embodiments of the present disclosure. This detailed description is for illustrative purposes only and is not intended to limit the embodiments of the present disclosure or the applications and uses of such embodiments.

In the following description, a statement "a width dimension of component A is equal to a width dimension of component B" or "a width dimension of component A and a width dimension of component B are equal to each other" means that an absolute value of a difference between the width dimension of component A and the width dimension of component B is within, for example, 10% of the width dimension of component A. Further, a statement "a length dimension of component A is equal to a length dimension of component B" or "a length dimension of component A and a length dimension of component B are equal to each other" means that an absolute value of a difference between a length dimension of component A and a length dimension of component B is within, for example, 10% of the length dimension of component A. Further, a statement "a distance A is equal to a distance B" or "a distance A and a distance B are equal to each other" means that an absolute value of a difference between the distance A and the distance B is within, for example, 10% of the distance A.

First Embodiment

Overall Configuration of Magnetism Detection Device

Figure 2:
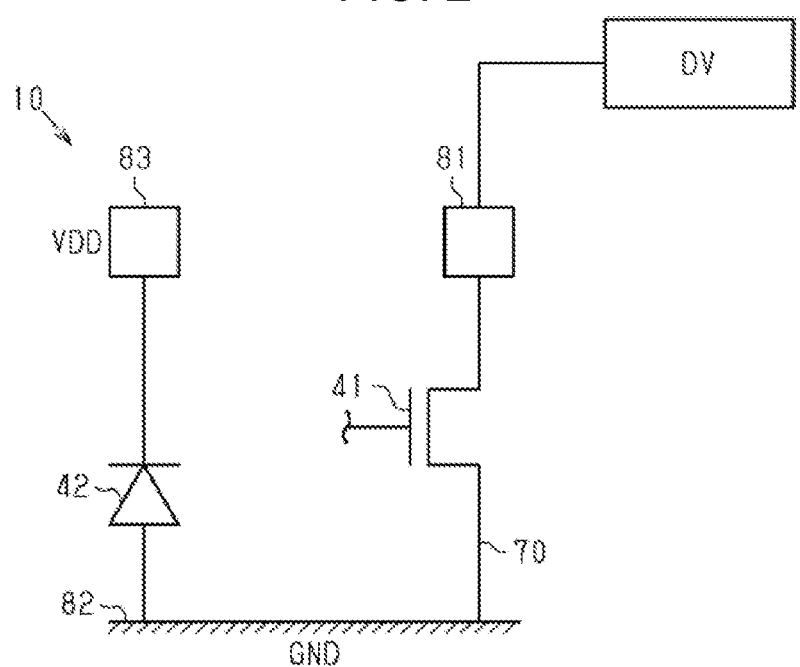
FIG. 2 is a schematic circuit diagram of the magnetism detection device of FIG. 1.

The overall configuration of a magnetism detection device 10 according to a first embodiment of the present disclosure will be described with reference to FIGS. 1 and 2. FIG. 1 shows a schematic planar structure of the magnetism detection device 10. FIG. 2 shows a schematic circuit configuration of the magnetism detection device 10.

The term "plan view" used in the present disclosure refers to viewing the magnetism detection device 10 in a Z direction of mutually orthogonal XYZ-axes shown in FIG. 1. Unless otherwise specified, the "plan view" refers to viewing the magnetism detection device 10 from above along the Z-axis.

As shown in FIG. 1, the magnetism detection device 10 includes a substrate 20, a magnetism detection element 30, a front surface wiring 70, and first to third terminals 81 to 83. The magnetism detection device 10 is provided as a semiconductor chip, for example. Although not shown, the magnetism detection device 10 may include a die pad configured to support the substrate 20, a lead frame disposed around the substrate 20, and a sealing resin that seals the substrate 20 and the lead frame. In this case, a portion of the lead frame is exposed from the sealing resin. Further, the substrate 20 and the lead frame may be connected by a wire.

The substrate 20 is formed, for example, in a shape of a rectangular flat plate whose thickness direction is the Z direction. In an example, the substrate 20 has a rectangular shape in which the X direction is a longitudinal direction and a Y direction is a lateral direction in a plan view. The substrate 20 has a substrate front surface 21 and a substrate back surface 22 facing opposite sides from each other in the Z direction, and first to fourth substrate side surfaces 23 to 26 connecting the substrate front surface 21 and the substrate back surface 22. The first substrate side surface 23 and the second substrate side surface 24 constitute both end surfaces of the substrate 20 in an X direction, and the third substrate side surface 25 and the fourth substrate side surface 26 constitute both end surfaces of the substrate 20 in the Y direction. The shape of the substrate 20 in a plan view may be arbitrarily changed. In an example, the shape of the substrate 20 in a plan view may be square.

The magnetism detection element 30 is located, for example, at the center of the substrate 20 in the X direction and the center thereof in the Y direction. The magnetism detection element 30 is configured to output a voltage according to a magnetic flux density of a magnetic field passing through the element in the Z direction. An example of the magnetism detection element 30 is a Hall element. In a plan view, the magnetism detection element 30 is formed in a rectangular shape. In an example, the shape of the magnetism detection element 30 in a plan view is square.

Although not shown, a processing circuit electrically connected to the magnetism detection element 30 and an element terminal, which is an external terminal electrically connected to the processing circuit, are formed at the substrate 20. The processing circuit is a circuit configured to perform signal processing such as noise removal from a signal magnetically detected by the magnetism detection element 30. The signal subjected to the signal processing is outputted to the element terminal as an output signal.

The first to third terminals 81 to 83 are arranged on the substrate front surface 21 at positions separated from the magnetism detection element 30. The first to third terminals 81 to 83 are arranged apart from the magnetism detection element 30 in the X direction. That is, the first to third terminals 81 to 83 are arranged apart from the magnetism detection element 30 in the longitudinal direction of the substrate 20. Here, the X direction corresponds to a "third direction." The first terminal 81 is spaced apart from the magnetism detection element 30 in the third direction, and the second terminal 82 is spaced apart from the magnetism detection element 30 in a direction opposite to the third direction. That is, the first terminal 81 and the second terminal 82 are arranged on both sides with the magnetism detection element 30 interposed therebetween. Therefore, it may be said that the first terminal 81 and the second terminal 82 (the third terminal 83) are arranged in a distributed manner on both sides of the magnetism detection element 30 in the third direction.

Further, in a case where the magnetism detection element 30 is disposed between the first terminal 81 and the second terminal 82 in the third direction when viewed from a direction orthogonal to the third direction, the first terminal 81 and the second terminal 82 may be said to be arranged in a distributed manner on both sides of the magnetism detection element 30 in the third direction. The third direction is not limited to the X direction and may be any direction different from the X direction in a plan view.

The first terminal 81 is interposed between the magnetism detection element 30 and the first substrate side surface 23 in a plan view. In an example, the first terminal 81 is disposed at a position adjacent to the first substrate side surface 23 in a plan view. That is, the first terminal 81 is disposed at an end, which is closer to the first substrate side surface 23, of both ends of the substrate 20 in the X direction (longitudinal direction). Further, the first terminal 81 is disposed at a position aligned with the magnetism detection element 30 in the Y direction.

The second terminal 82 and the third terminal 83 are interposed between the magnetism detection element 30 and the second substrate side surface 24 in a plan view. In an example, the second terminal 82 and the third terminal 83 are arranged at positions adjacent to the second substrate side surface 24 in a plan view. That is, the second terminal 82 and the third terminal 83 are arranged at an end, which is closer to the second substrate side surface 24, of both ends of the substrate 20 in the X direction. Further, the second terminal 82 is disposed at a position aligned with the magnetism detection element 30 in the Y direction. The second terminal 82 is disposed at a position aligned with the first terminal 81 in the Y direction.

The second terminal 82 and the third terminal 83 are arranged at the same position in the X direction and are spaced apart from each other in the Y direction. The third terminal 83 is interposed between the second terminal 82 and the fourth substrate side surface 26. The third terminal 83 is disposed at a position adjacent to the fourth substrate side surface 26 in the Y direction. Therefore, the third terminal 83 is disposed at a position closer to the fourth substrate side surface 26 than the magnetism detection element 30 in the Y direction.

The first terminal 81 is a terminal to which a current of, for example, several mA to several tens of mA is supplied from a DC power supply DV (FIG. 2) provided outside the magnetism detection device 10. Therefore, the first terminal 81 may be referred to as a large current application terminal. In an example, the first terminal 81 may be supplied with a current of 10 mA or more and 50 mA or less. The second terminal 82 is a ground (GND) terminal, and the third terminal 83 is a power supply terminal. The second terminal 82 and the third terminal 83 are terminals configured to supply a power supply voltage VDD to circuit elements mounted on the magnetism detection device 10. The circuit elements include, for example, elements constituting a detection circuit to which the magnetism detection element 30 is connected, a drive circuit for a driver element 41, and the like. The first to third terminals 81 to 83 are made of one or more appropriately selected from the group of, for example, Ti (titanium), TiN (titanium nitride), Ta (tantalum), TaN (tantalum nitride), Au (gold), Ag (silver), Cu (copper), Al (aluminum), Ni (nickel), Pd (palladium), and W (tungsten).

The front surface wiring 70 is formed over the substrate front surface 21. The front surface wiring 70 is configured to electrically connect the first terminal 81 and the second terminal 82. The front surface wiring 70 is made of one or more appropriately selected from the group of, for example, Ti, TiN, Ta, TaN, Au, Ag, Cu, Al, Ni, Pd, and W. In an example, the front surface wiring 70 is made of a material containing Al.

In an example, the magnetism detection device 10 includes a driver element 41 and a protection element 42. The driver element 41 is an element configured to control a current flowing through the front surface wiring 70. The driver element 41 is constituted by a transistor. For example, a MOSFET is used as the transistor. In an example, a current flows from the first terminal 81 to the front surface wiring 70 when the driver element 41 is in an on state. In this way, the driver element 41 corresponds to a "transistor."

The driver element 41 is interposed between the magnetism detection element 30 and the first substrate side surface 23 in a plan view. The driver element 41 is provided, for example, at a position adjacent to the first substrate side surface 23 in a plan view. The driver element 41 is formed, for example, over substantially the entire substrate 20 in the Y direction. The first terminal 81 is disposed at a position overlapping the driver element 41 in a plan view.

The protection element 42 is an element configured to protect a circuit element connected to the third terminal 83 when a voltage higher than the power supply voltage VDD is applied to the third terminal 83 due to static electricity, for example. For example, a diode is used as the protection element 42. The protection element 42 as a diode has its anode electrically connected to the second terminal 82 and its cathode electrically connected to the third terminal 83.

The protection element 42 is disposed near the second terminal 82 and the third terminal 83. The protection element 42 is interposed between the magnetism detection element 30 and the second substrate side surface 24 in a plan view. The protection element 42 is provided, for example, at a position adjacent to the second substrate side surface 24 in a plan view. The protection element 42 is formed, for example, over substantially the entire substrate 20 in the Y direction. Both the second terminal 82 and the third terminal 83 are arranged at positions overlapping the protection element 42 in a plan view.

As shown in FIG. 2, the first terminal 81 is electrically connected to a drain of the MOSFET serving as the driver element 41. A gate of the driver element 41 is electrically connected to a control terminal (not shown). A source of the driver element 41 is electrically connected to the second terminal 82 via the front surface wiring 70. The second terminal 82 is electrically connected to the anode of the protection element 42. The third terminal 83 is electrically connected to the cathode of the protection element 42.

For example, the DC power supply DV is electrically connected to the magnetism detection device 10. A positive electrode of the DC power supply DV is electrically connected to the first terminal 81, for example. Therefore, a current from the DC power supply DV flows to the second terminal 82 via the first terminal 81, the driver element 41, and the front surface wiring 70 in this order.

Cross-Sectional Structure of Magnetism Detection Device

Figure 3:
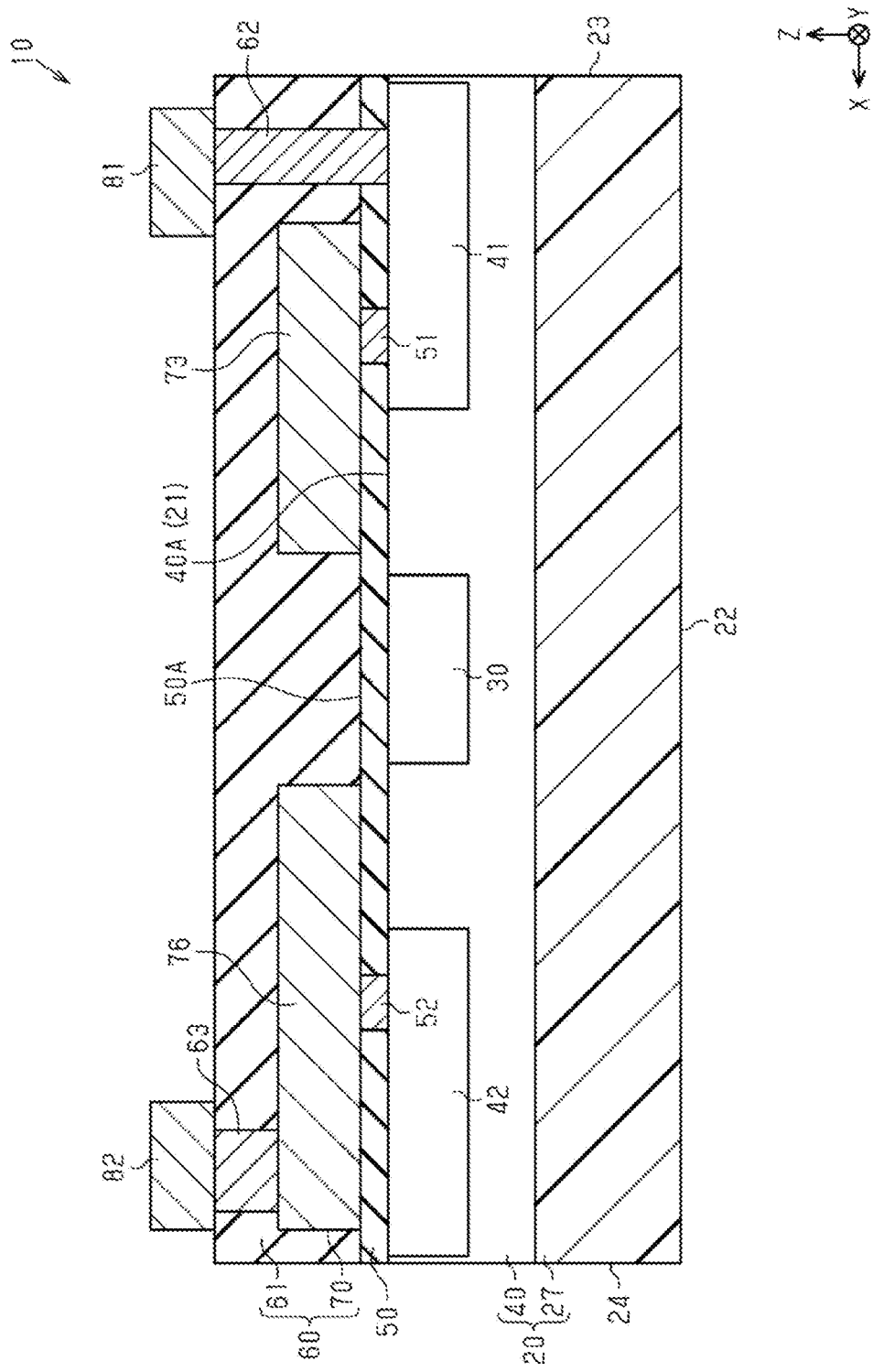
FIG. 3 is a schematic cross-sectional view of the magnetism detection device, which is taken along line F3-F3 in FIG. 1.

A cross-sectional structure of the magnetism detection device 10 will be described with reference to FIG. 3. FIG. 3 shows a schematic cross-sectional structure of the magnetism detection device 10, which is taken along line F3-F3 in FIG. 1. In FIG. 3, in order to easily understand the figure, regions where the driver element 41 and the protection element 42, which will be described later, are to be formed are marked with dots.

As shown in FIG. 3, the substrate 20 includes a semiconductor substrate 27 and a semiconductor layer 40 provided over the semiconductor substrate 27. The semiconductor substrate 27 is formed in a shape of a rectangular flat plate with the thickness direction in the Z direction. The semiconductor substrate 27 is made of, for example, a material containing Si (silicon). The semiconductor substrate 27 may be made of a wide band gap semiconductor or a compound semiconductor. The wide band gap semiconductor is a semiconductor substrate having a band gap of 2.0 eV or more. The wide band gap semiconductor may be SiC (silicon carbide). The compound semiconductor may be a III-V compound semiconductor. The compound semiconductor may include at least one selected from the group of AlN (aluminum nitride), InN (indium nitride), GaN (gallium nitride), and GaAs (gallium arsenide).

The semiconductor layer 40 is constituted by an epitaxial layer whose thickness direction is the Z direction. In an example, the semiconductor layer 40 as the epitaxial layer contains n-type impurities. The n-type impurity concentration is, for example, $1 \times 10^{14}$ cm$^{-3}$ or more and $1 \times 10^{16}$ cm$^{-3}$ or less.

In the first embodiment of the present disclosure, each of the magnetism detection element 30, the driver element 41, and the protection element 42 is provided at the substrate 20. More specifically, each of the magnetism detection element 30, the driver element 41, and the protection element 42 is provided at the semiconductor layer 40. The front surface 40A of the semiconductor layer 40 constitutes the substrate front surface 21. Each of the magnetism detection element 30, the driver element 41, and the protection element 42 is provided at a surface layer of the semiconductor layer 40 (a region including the front surface 40A of the semiconductor layer 40). Therefore, it may be said that each of the magnetism detection element 30, the driver element 41, and the protection element 42 is provided at the substrate front surface 21.

An insulating layer 50 and a wiring layer 60 are laminated in this order over the semiconductor layer 40. That is, the magnetism detection device 10 includes the insulating layer 50 provided over the semiconductor layer 40 and the wiring layer 60 provided over the insulating layer 50.

The insulating layer 50 is formed over the entire substrate front surface 21. The insulating layer 50 is made of a material containing at least one selected from the group of, for example, SiN (silicon nitride) and SiO$_2$ (silicon oxide). The insulating layer 50 may have a laminated structure of a SiN layer and a SiO$_2$ layer.

A first contact 51 and a second contact 52 electrically connected to the source of the driver element 41 are formed in the insulating layer 50 at a position overlapping the driver element 41 in a plan view. The first contact 51 is in contact with the driver element 41 by penetrating the insulating layer 50 in the Z direction. The second contact 52 is in contact with the protection element 42 by penetrating the insulating layer 50 in the Z direction. Each of the first contact 51 and the second contact 52 is made of one or more appropriately selected from the group of, for example, Ti, TiN, Ta, TaN, Au, Ag, Cu, Al, Ni, Pd, and W.

The wiring layer 60 is a layer that forms a portion of a conductive path between the first terminal 81 and the second terminal 82. The wiring layer 60 includes a wiring insulating film 61 and a front surface wiring 70. The front surface wiring 70 is disposed on the front surface 50A of the insulating layer 50. In an example, the front surface wiring 70 is disposed at a position that partially overlaps the first terminal 81 in a plan view. Further, in an example, the front surface wiring 70 is disposed at a position that at least partially overlaps the second terminal 82 in a plan view.

Since the wiring layer 60 is provided over the insulating layer 50, the wiring layer 60 is disposed at a different position from the magnetism detection element 30 in the Z direction. In other words, the front surface wiring 70 is disposed at a different position from the magnetism detection element 30 in the Z direction. The front surface wiring 70 is disposed on the opposite side of the semiconductor substrate 27 with respect to the magnetism detection element 30 in the Z direction.

The wiring insulating film 61 covers both the front surface wiring 70 and the front surface 50A of the insulating layer 50 exposed from the front surface wiring 70. The wiring insulating film 61 is an interlayer insulating film and is made of, for example, a material containing $SiO_2$.

A third contact 62 and a fourth contact 63 are provided at the wiring layer 60. The third contact 62 electrically connects the first terminal 81 and the drain of the driver element 41. The fourth contact 63 electrically connects the second terminal 82 and the front surface wiring 70.

The third contact 62 is disposed at a different position from the front surface wiring 70 in a plan view. In an example, the third contact 62 is interposed between the front surface wiring 70 and the first substrate side surface 23 in the X direction. The third contact 62 is disposed at a position overlapping the first terminal 81 in a plan view. The third contact 62 penetrates both the wiring insulating film 61 and the insulating layer 50 in the Z direction. As a result, the third contact 62 is in contact with both the first terminal 81 and the driver element 41.

The fourth contact 63 is disposed at a position overlapping both the second terminal 82 and the front surface wiring 70 in a plan view. The fourth contact 63 penetrates a portion of the wiring insulating film 61 that covers the front surface wiring 70 in the Z direction. As a result, the fourth contact 63 is in contact with both the second terminal 82 and the front surface wiring 70.

Although not shown, a fifth contact is provided at the wiring layer 60. The fifth contact electrically connects the third terminal 83 (see FIG. 1) and the cathode of the protection element 42. The fifth contact is disposed at a position overlapping both the protection element 42 and the third terminal 83 in a plan view.

Each of the third contact 62, the fourth contact 63, and the fifth contact is made of one or more appropriately selected from the group of, for example, Ti, TiN, Ta, TaN, Au, Ag, Cu, Al, Ni, Pd, and W.

The first to third terminals 81 to 83 are arranged on the wiring layer 60. The first terminal 81 and the second terminal 82 are shown in FIG. 3. The first terminal 81 is electrically connected to the drain of the driver element 41 via the third contact 62. Since the source of the driver element 41 is electrically connected to the front surface wiring 70 via the first contact 51, it may be said that the first terminal 81 is electrically connected to the front surface wiring 70 via the driver element 41.

Configuration of Front Surface Wiring and Relationship Between Magnetism Detection Element and Front Surface Wiring A configuration of the front surface wiring 70 and a relationship between the magnetism detection element 30 and the front surface wiring 70 will be described with reference to FIG. 4.

The front surface wiring 70 includes a first wiring 71, a second wiring 72, a first connection wiring 73, a first branch wiring 74, a second branch wiring 75, a second connection wiring 76, a third branch wiring 77, and a fourth branch wiring 78. In an example, these wirings 71 to 78 are integrally formed. In FIG. 4, these wirings 71 to 78 are partitioned by broken lines for the sake of convenience. Further, since the front surface wiring 70 is provided at the front surface 50A of the insulating layer 50 in FIG. 3, the first wiring 71, the second wiring 72, the first connection wiring 73, the first branch wiring 74, the second branch wiring 75, the second connection wiring 76, the third branch wiring 77, and the fourth branch wiring 78 are arranged at the same position in the Z direction.

The first wiring 71 and the second wiring 72 are arranged on both sides of the magnetism detection element 30 so as to face each other. In an example, the first wiring 71 and the second wiring 72 are arranged on both sides of the magnetism detection element 30 in the Y direction so as to face each other in a plan view. Here, the Y direction corresponds to a "fourth direction." Both the first wiring 71 and the second wiring 72 are arranged on the opposite side of the semiconductor substrate 27 (see FIG. 3) with respect to the magnetism detection element 30 in the Z direction.

Both the first wiring 71 and the second wiring 72 extend in the X direction. Therefore, it may be said that the first wiring 71 and the second wiring 72 are parallel to each other in a plan view. In an example, both a length dimension L1 of the first wiring 71 and a length dimension L2 of the second wiring 72 are larger than a dimension of the magnetism detection element 30 in the X direction. The length dimension L1 of the first wiring 71 and the length dimension L2 of the second wiring 72 may be equal to each other.

Here, the length dimension L1 of the first wiring 71 is a dimension in a direction in which the first wiring 71 extends in a plan view. In an example, the length dimension L1 of the first wiring 71 is a dimension of the first wiring 71 in the X direction. The length dimension L2 of the second wiring 72 is a dimension in a direction in which the second wiring 72 extends in a plan view. In an example, the length dimension L2 of the second wiring 72 is a dimension of the second wiring 72 in the X direction.

A width dimension W1 of the first wiring 71 and a width dimension W2 of the second wiring 72 may be equal to each other. Here, the width dimension W1 of the first wiring 71 is a dimension in a direction orthogonal to a direction in which the first wiring 71 extends in a plan view. In an example, the width dimension W1 of the first wiring 71 is a dimension of the first wiring 71 in the Y direction. The width dimension W2 of the second wiring 72 is the dimension in a direction orthogonal to a direction in which the second wiring 72 extends in a plan view. In an example, the width dimension W2 of the second wiring 72 is a dimension of the second wiring 72 in the Y direction.

The first connection wiring 73 extends in the X direction. The first connection wiring 73 is disposed closer to the first terminal 81 than the magnetism detection element 30 in the X direction. In a plan view, the position of the first connection wiring 73 in the Y direction is the same as the position of the first terminal 81 in the Y direction. The first connection wiring 73 is a part of the front surface wiring 70 that is closest to the first terminal 81.

The first connection wiring 73 is electrically connected to the first terminal 81. More specifically, the first terminal 81 and the first connection wiring 73 are electrically connected to each other via the driver element 41 (see FIG. 3) which is a transistor. The first connection wiring 73 is electrically connected to the source of the driver element 41. Specifically, the first connection wiring 73 is connected to the first contact 51 (see FIG. 3) connected to the source of the driver element 41.

The width dimension W3 of the first connection wiring 73 may be equal to the width dimension W1 of the first wiring 71. Here, the width dimension W3 of the first connection wiring 73 is a dimension in a direction orthogonal to a direction in which the first connection wiring 73 extends in a plan view. In an example, the width dimension W3 of the first connection wiring 73 is a dimension of the first connection wiring 73 in the Y direction. Further, the width dimension W3 of the first connection wiring 73 may be equal to the width dimension W2 of the second wiring 72.

The first branch wiring 74 branches from the first connection wiring 73 and is connected to the first wiring 71. The first branch wiring 74 is disposed closer to the first terminal 81 than the magnetism detection element 30 in the X direction. The first branch wiring 74 extends in the Y direction.

A dimension width W4 of the first branch wiring 74 may be equal to the width dimension W1 of the first wiring 71. Here, a width dimension W4 of the first branch wiring 74 is a dimension in a direction orthogonal to a direction in which the first branch wiring 74 extends in a plan view. In an example, the width dimension W4 of the first branch wiring 74 is a dimension of the first branch wiring 74 in the X direction. Further, the width dimension W4 of the first branch wiring 74 may be equal to the width dimension W2 of the second wiring 72.

The second branch wiring 75 branches from the first connection wiring 73 and is connected to the second wiring 72. The second branch wiring 75 is disposed closer to the first terminal 81 than the magnetism detection element 30 in the X direction. The position of the second branch wiring 75 in the X direction is the same as the position of the first branch wiring 74 in the X direction. The second branch wiring 75 is disposed on the opposite side of the first branch wiring 74 with respect to the first connection wiring 73 in the Y direction. The second branch wiring 75 extends in the Y direction.

A width dimension W5 of the second branch wiring 75 may be equal to the width dimension W4 of the first branch wiring 74. Here, the width dimension W5 of the second branch wiring 75 is a dimension in a direction orthogonal to a direction in which the second branch wiring 75 extends in a plan view.

A length dimension L5 of the second branch wiring 75 may be equal to a length dimension L4 of the first branch wiring 74. Here, the length dimension L5 of the second branch wiring 75 is a dimension in a direction in which the second branch wiring 75 extends. In an example, the length dimension L5 of the second branch wiring 75 is a dimension of the second branch wiring 75 in the Y direction. The length dimension L4 of the first branch wiring 74 is a dimension in a direction in which the first branch wiring 74 extends. In an example, the length dimension L4 of the first branch wiring 74 is a dimension of the first branch wiring 74 in the Y direction.

The second connection wiring 76 extends in the X direction. The second connection wiring 76 is disposed closer to the second terminal 82 than both the first wiring 71 and the second wiring 72 in the X direction. In a plan view, the position of the second connection wiring 76 in the Y direction is the same as the position of the second terminal 82 in the Y direction. The second connection wiring 76 is a part of the front surface wiring 70 that is closest to the second terminal 82.

The second connection wiring 76 is electrically connected to the second terminal 82. More specifically, the second terminal 82 and the second connection wiring 76 are electrically connected to each other via the fourth contact 63 (see FIG. 3).

A width dimension W6 of the second connection wiring 76 may be equal to the width dimension W1 of the first wiring 71. Here, the width dimension W6 of the second connection wiring 76 is a dimension in a direction orthogonal to a direction in which the second connection wiring 76 extends in a plan view. In an example, the width dimension W6 of the second connection wiring 76 is a dimension of the second connection wiring 76 in the Y direction. Further, the width dimension W6 of the second connection wiring 76 may be equal to the width dimension W2 of the second wiring 72. Further, the width dimension W6 of the second connection wiring 76 may be equal to the width dimension W3 of the first connection wiring 73.

The third branch wiring 77 branches from the second connection wiring 76 and is connected to the first wiring 71. The third branch wiring 77 is disposed closer to the second terminal 82 than the magnetism detection element 30 in the X direction. The position of the third branch wiring 77 in the Y direction is equal to the position of the first branch wiring 74 in the Y direction. Therefore, the third branch wiring 77 and the first branch wiring 74 are arranged on both sides of the magnetism detection element 30 in the X direction so as to face each other. The third branch wiring 77 extends in the Y direction. Further, the third branch wiring 77 and the second branch wiring 75 are arranged on both sides of the magnetism detection element 30 in the X direction.

A width dimension W7 of the third branch wiring 77 may be equal to the width dimension W1 of the first wiring 71. Here, the width dimension W7 of the third branch wiring 77 is a dimension in a direction orthogonal to a direction in which the third branch wiring 77 extends in a plan view. In an example, the width dimension W7 of the third branch wiring 77 is a dimension of the third branch wiring 77 in the X direction. The width dimension W7 of the third branch wiring 77 may be equal to the width dimension W4 of the first branch wiring 74.

The width dimension W7 of the third branch wiring 77 and the width dimension W5 of the second branch wiring 75 may be equal to each other. Further, the width dimension W7 of the third branch wiring 77 and the width dimension W4 of the first branch wiring 74 may be equal to each other.

A length dimension L7 of the third branch wiring 77 and the length dimension L5 of the second branch wiring 75 may be equal to each other. Here, the length dimension L7 of the third branch wiring 77 is a dimension in a direction in which the third branch wiring 77 extends in a plan view. In an example, the length dimension L7 of the third branch wiring 77 is a dimension of the third branch wiring 77 in the Y direction. Further, the length dimension L7 of the third branch wiring 77 may be equal to the length dimension L4 of the first branch wiring 74.

The fourth branch wiring 78 branches from the second connection wiring 76 and is connected to the second wiring 72. The fourth branch wiring 78 is disposed closer to the second terminal 82 than the magnetism detection element 30 in the X direction. The position of the fourth branch wiring 78 in the X direction is the same as the position of the third branch wiring 77 in the X direction. The fourth branch wiring 78 is disposed on the opposite side of the third branch wiring 77 with respect to the second connection wiring 76 in the Y direction. Therefore, the fourth branch wiring 78 and the second branch wiring 75 are arranged on both sides of the magnetism detection element 30 in the X direction so as to face each other. The fourth branch wiring 78 extends in the Y direction. Further, the fourth branch wiring 78 and the first branch wiring 74 are arranged on both sides of the magnetism detection element 30 in the X direction.

A width dimension W8 of the fourth branch wiring 78 may be equal to the width dimension W4 of the first branch wiring 74. Here, the width dimension W8 of the fourth branch wiring 78 is the dimension in a direction orthogonal to a direction in which the fourth branch wiring 78 extends in a plan view.

A length dimension L8 of the fourth branch wiring 78 may be equal to the length dimension L4 of the first branch wiring 74. Here, the length dimension L8 of the fourth branch wiring 78 is a dimension in a direction in which the fourth branch wiring 78 extends. In an example, the length dimension L8 of the fourth branch wiring 78 is a dimension of the fourth branch wiring 78 in the Y direction.

Each of the first branch wiring 74, the second branch wiring 75, the third branch wiring 77, and the fourth branch wiring 78 is disposed on the opposite side of the semiconductor substrate 27 with respect to the magnetism detection element 30 in the Z direction.

Thicknesses of the first wiring 71, the second wiring 72, the first connection wiring 73, the first branch wiring 74, the second branch wiring 75, the second connection wiring 76, the third branch wiring 77, and the fourth branch wiring 78 may be equal to one another.

Therefore, a first area, which is an area of a cross section of the first wiring 71, taken along a YZ plane, may be equal to a second area which is an area of a cross section of the second wiring 72, taken along the YZ plane. Here, in a case where a difference between the first area and the second area is, for example, within 10% of the first area, it may be said that the first area is equal to the second area.

Further, a third area, which is an area of a cross section of the first connection wiring 73, taken along the YZ plane, may be equal to the first area (the second area). Here, in a case where a difference between the third area and the first area (the second area) is, for example, within 10% of the third area, it may be said that the third area is equal to the first area (the second area).

Further, a sixth area, which is an area of a cross section of the second connection wiring 76, taken along the YZ plane, may be equal to the third area. Here, in a case where a difference between the sixth area and the third area is, for example, within 10% of the sixth area, it may be said that the sixth area is equal to the third area.

Further, a fourth area, which is an area of a cross section of the first branch wiring 74, taken along an XZ plane, may be equal to an eighth area which is an area of a cross section of the fourth branch wiring 78, taken along the XZ plane. Here, in a case where a difference between the fourth area and the eighth area is, for example, within 10% of the fourth area, it may be said that the fourth area is equal to the eighth area.

Further, a fifth area, which is an area of a cross section of the second branch wiring 75, taken along the XZ plane, may be equal to a seventh area which is an area of a cross section of the third branch wiring 77, taken along the XZ plane. Here, in a case where a difference between the fifth area and the seventh area is, for example, within 10% of the fifth area, it may be said that the fifth area is equal to the seventh area.

When a current flows from the first terminal 81 to the second terminal 82, a width dimension, a length dimension, and a thickness of each of the wirings 71, 72, 74, 75, 77, and 78 of the front surface wiring 70 are set such that an amount of current flowing in the order of the first branch wiring 74, the first wiring 71, and the fourth branch wiring 78 is equal to an amount of current flowing in the order of the second branch wiring 75, the second wiring 72, and the third branch wiring 77. In an example, as described above, the width dimension W4 and the length dimension L4 of the first branch wiring 74 are equal to the width dimension W5 and the length dimension L5 of the second branch wiring 75, the width dimension W1 and the length dimension L1 of the first wiring 71 are equal to the width dimension W2 and the length dimension L2 of the second wiring 72, and the width dimension W7 and the length dimension L7 of the third branch wiring 77 are equal to the width dimension W8 and the length dimension L8 of the fourth branch wiring 78. Further, the thickness of the front surface wiring 70 is constant. As a result, since resistance values in the first branch wiring 74, the first wiring 71, and the fourth branch wiring 78 become equal to the resistance values in the second branch wiring 75, the second wiring 72, and the third branch wiring 77, an amount of current flowing in the order of the first branch wiring 74, the first wiring 71, and the fourth branch wiring 78 becomes equal to an amount of current flowing in the order of the second branch wiring 75, the second wiring 72, and the third branch wiring 77.

In an example, the width dimension of each of the wirings 71, 72, 74, 75, 77, and 78 is several tens of μm (for example, 30 μm). Further, the width dimension of each of the wirings 71, 72, 74, 75, 77, and 78 is set according to the amount of current flowing from the first terminal 81 to the second terminal 82, for example.

In a case where the amount of current flowing in the order of the first branch wiring 74, the first wiring 71, and the fourth branch wiring 78 may be equal to the amount of current flowing in the order of the second branch wiring 75, the second wiring 72, and the third branch wiring 77, the width dimension, length dimension, and thickness of each of the wirings 71, 72, 74, 75, 77, and 78 of the front surface wiring 70 may be changed as appropriate.

Figure 4:
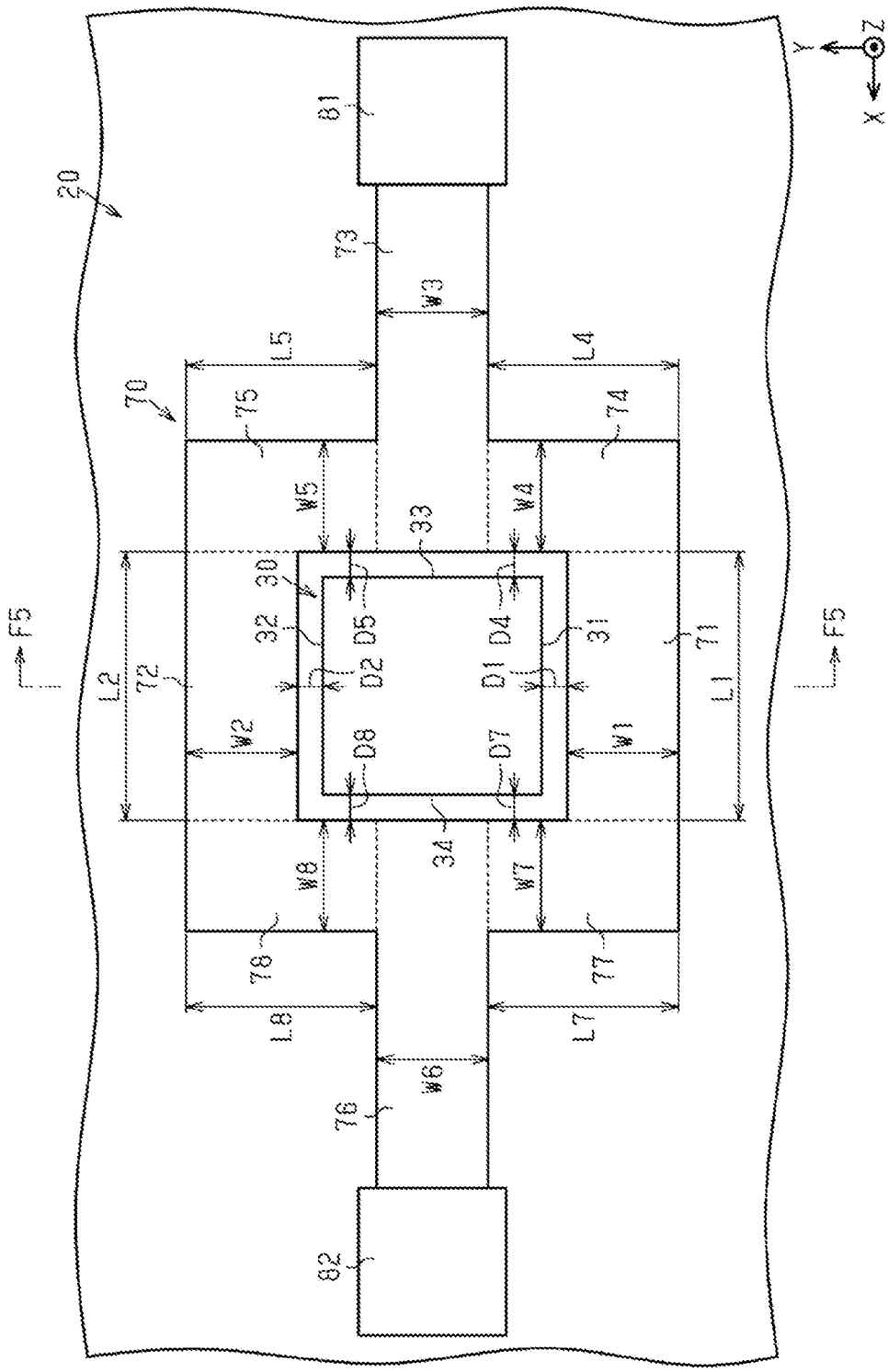
FIG. 4 is an enlarged plan view of a magnetism detection element, a front surface wiring, a first terminal, and a second terminal of FIG. 1.

As shown in FIG. 4, in a plan view, the first wiring 71, the second wiring 72, the first branch wiring 74, the second branch wiring 75, the third branch wiring 77, and the fourth branch wiring 78 are formed to surround the entire circumference of the magnetism detection element 30. In a plan view, the first wiring 71, the second wiring 72, the first branch wiring 74, the second branch wiring 75, the third branch wiring 77, and the fourth branch wiring 78 have a rectangular frame shape.

The first wiring 71, the second wiring 72, the first branch wiring 74, the second branch wiring 75, the third branch wiring 77, and the fourth branch wiring 78 are arranged adjacent to the magnetism detection element 30 in a plan view. More specifically, the magnetism detection element 30, which has a square shape in a plan view, includes first to fourth sides 31 to 34. The first side 31 and the second side 32 constitute both end surfaces of the magnetism detection element 30 in the Y direction. The third side 33 and the fourth side 34 constitute both end surfaces of the magnetism detection element 30 in the X direction. The first side 31 is provided at a position adjacent to the first wiring 71 in the Y direction in a plan view, and the second side 32 is provided at a position adjacent to the second wiring 72 in the Y direction in a plan view. The third side 33 is provided at a position adjacent to the first branch wiring 74 and the second branch wiring 75 in the X direction in a plan view, and the fourth side 34 is provided at a position adjacent to the third branch wiring 77 and the forth branch wiring 78 in the X direction in a plan view.

The first side 31 and the second side 32 extend in the Y direction in a plan view. The third side 33 and the fourth side 34 extend in the X direction in a plan view. That is, the first side 31 adjacent to the first wiring 71 in a plan view is parallel to the first wiring 71. The second side 32 adjacent to the second wiring 72 in a plan view is parallel to the second wiring 72. The third side 33 adjacent to the first branch wiring 74 and the second branch wiring 75 in a plan view is parallel to the first branch wiring 74 and the second branch wiring 75. The fourth side 34 adjacent to the third branch wiring 77 and the fourth branch wiring 78 in a plan view is parallel to the third branch wiring 77 and the fourth branch wiring 78.

In the first embodiment, a distance D1 between the first wiring 71 and the magnetism detection element 30 in the Y direction may be equal to a distance D2 between the second wiring 72 and the magnetism detection element 30 in the Y direction. Further, a distance D4 between the first branch wiring 74 and the magnetism detection element 30 in the X direction may be equal to a distance D8 between the fourth branch wiring 78 and the magnetism detection element 30 in the X direction.

Further, a distance D5 between the second branch wiring 75 and the magnetism detection element 30 in the X direction may be equal to a distance D7 between the third branch wiring 77 and the magnetism detection element 30 in the X direction. Further, the distance D4 may be equal to the distance D5. The distance D7 may be equal to the distance D8. The distance D1 may be equal to the distance D4. The distance D1 may be equal to the distance D7. The distance D2 may be equal to the distance D8. The distance D2 may be equal to the distance D5. In the example shown in FIG. 4, the distances D1, D2, D4, D5, D7, and D8 are equal to one another.

Operation

An operation of the magnetism detection device 10 according to the first embodiment will be described with reference to FIGS. 5 and 6. FIG. 6 shows a planar structure of a magnetism detection device 10X of a comparative example. The magnetism detection device 10X of the comparative example has a different configuration of a front surface wiring 70X. Therefore, in the magnetism detection device 10X of the comparative example, components other than the front surface wiring 70X are denoted by the same reference numerals, and the explanation thereof will not be repeated.

As shown in FIG. 6, in the magnetism detection device 10X of the comparative example, the front surface wiring 70X is disposed to be separated from the magnetism detection element 30 in the Y direction. More specifically, the front surface wiring 70X is disposed at a position adjacent to the third substrate side surface 25 of the substrate 20 in the Y direction. This reduces an influence of a magnetic field generated by the front surface wiring 70X on the magnetism detection element 30 when a current is supplied from the first terminal 81 to the second terminal 82 via the front surface wiring 70X.

However, since the magnetism detection device 10X of the comparative example is a semiconductor chip, there is a limit to increasing a distance between the front surface wiring 70X and the magnetism detection element 30 in the Y direction. As a result, it is difficult to sufficiently reduce the influence of the magnetic field generated by the front surface wiring 70X on the magnetism detection element 30.

Figure 5:
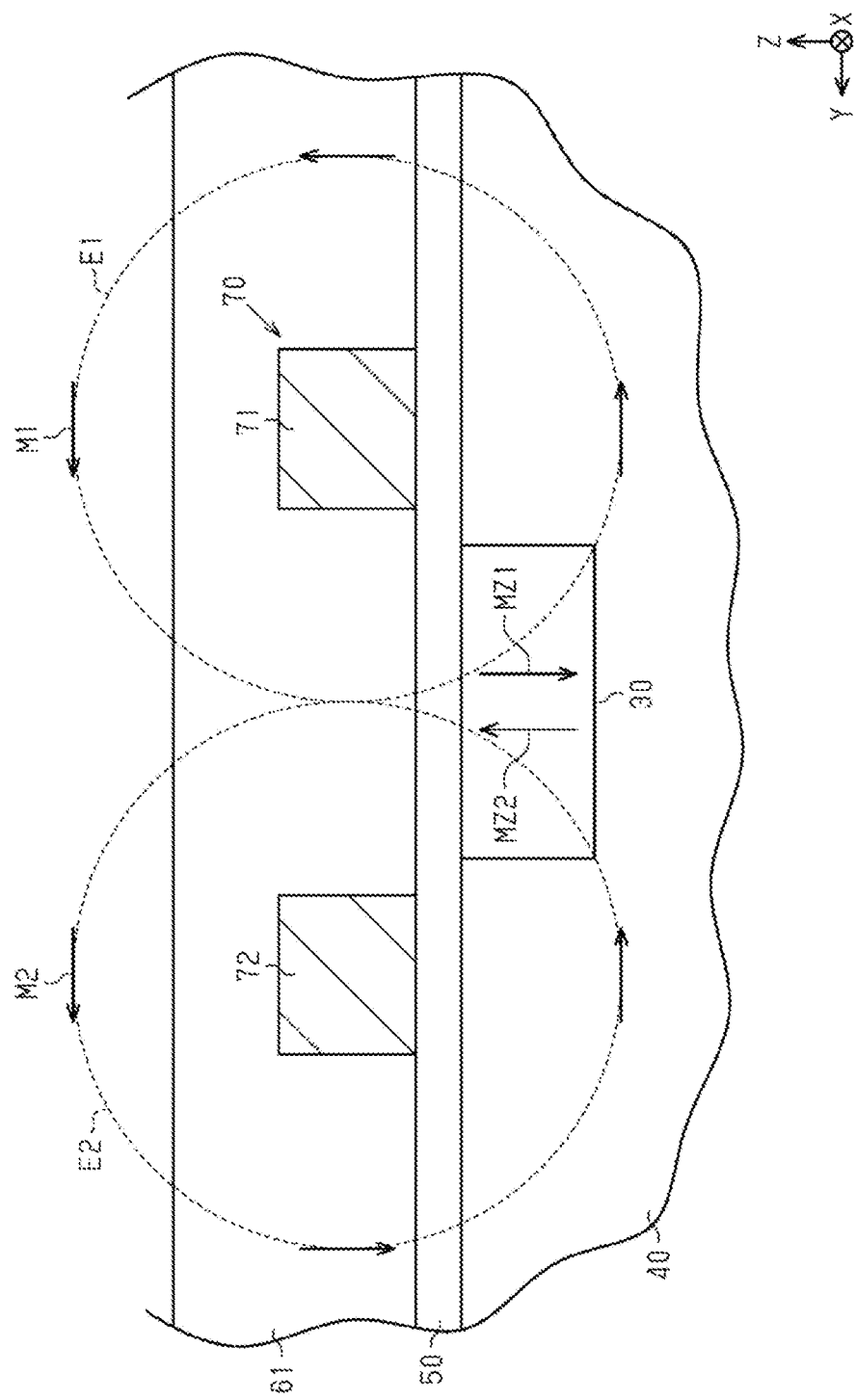
FIG. 5 is a schematic cross-sectional structure view of the magnetism detection device, which is taken along line F5-F5 in FIG. 4, showing a relationship between magnetic fields of a first wiring/a second wiring and a magnetism detection element.
Figure 6:
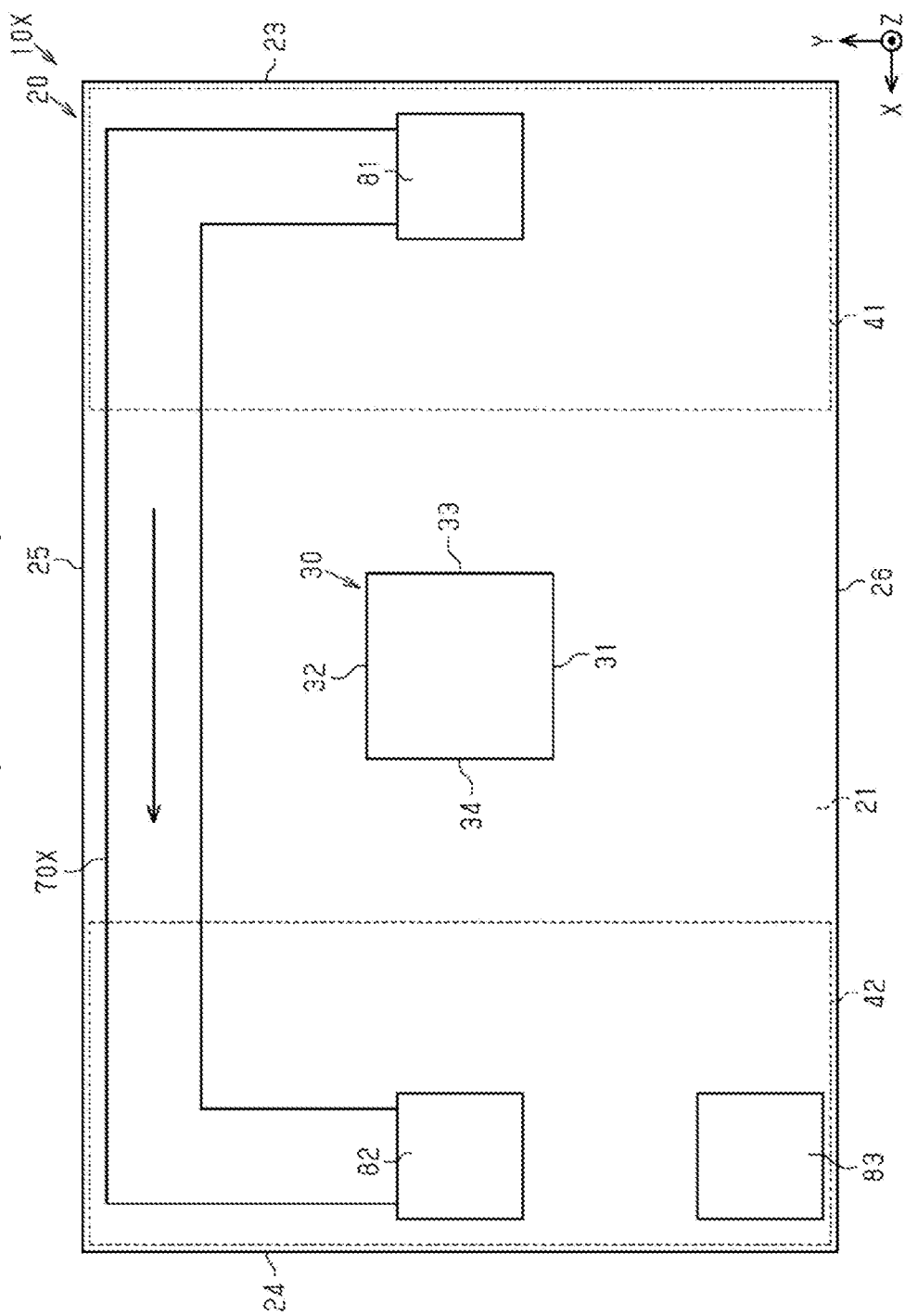
FIG. 6 is a schematic plan view of a magnetism detection device of a comparative example.

In this regard, as shown in FIG. 5, in the magnetism detection device 10 of the first embodiment, the first wiring 71 and the second wiring 72 are arranged on both sides of the magnetism detection element 30 in the Y direction, and when a current flows from the first terminal 81 to the second terminal 82, a current flows through the first wiring 71 and the second wiring 72 in the same direction. As a result, when the current flows from the first terminal 81 to the second terminal 82, a first magnetic field E1 in a first magnetic direction M1 is generated in the first wiring 71. Then, when the current flows from the first terminal 81 to the second terminal 82, a second magnetic field E2 in a second magnetic direction M2, which is the same direction as the first magnetic direction M1, is generated in the second wiring 72. Since the first wiring 71 and the second wiring 72 are arranged on both sides of the magnetism detection element 30 in the Y direction, the first magnetic field E1 and the second magnetic field E2 are in a direction in which the first magnetic direction M1 and the second magnetic direction M2 intersect with each other in the magnetism detection element 30.

Then, a first direction component MZ1 along the Z direction in a magnetic field passing through the magnetism detection element 30 in the first magnetic field E1 is in the opposite direction to a second direction component MZ2 along the Z direction in a magnetic field passing through the magnetism detection element 30 in the second magnetic field E2. That is, the first direction component MZ1 and the second direction component MZ2 weaken each other, such that the influence of the first magnetic field E1 and the second magnetic field E2 on the magnetism detection element 30 may be reduced.

Here, since the magnetism detection element 30 is configured to detect the magnetism in the Z direction, the first direction component MZ1 and the second direction component MZ2 weaken each other, such that the influence of the first magnetic field E1 and the second magnetic field E2 in a magnetism detection direction of the magnetism detection element 30 may be reduced.

Further, the first branch wiring 74 and the fourth branch wiring 78 are arranged on both sides of the magnetism detection element 30 in the X direction, and when a current flows from the first terminal 81 to the second terminal 82, a current flows through the first branch wiring 74 and the fourth branch wiring 78 in the same direction. Therefore, a direction (magnetic direction) of a magnetic field generated by the first branch wiring 74 and a direction (magnetic direction) of a magnetic field generated by the fourth branch wiring 78 are directions that intersect with each other in the magnetism detection element 30. As a result, a component of the magnetic field of the first branch wiring 74 that passes through the magnetism detection element 30 along the Z direction is in the opposite direction to a component of the magnetic field of the fourth branch wiring 78 that passes through the magnetism detection element 30 along the Z direction. In other words, these components weaken each other, thereby reducing an influence of the magnetic field of the first branch wiring 74 and the magnetic field of the fourth branch wiring 78 on the magnetism detection element 30.

Further, the second branch wiring 75 and the third branch wiring 77 are arranged on both sides of the magnetism detection element 30 in the X direction, and when a current flows from the first terminal 81 to the second terminal 82, a current flows through the second branch wiring 75 and the third branch wiring 77 in the same direction. Therefore, a direction (magnetic direction) of a magnetic field generated by the second branch wiring 75 and a direction (magnetic direction) of a magnetic field generated by the third branch wiring 77 are directions that intersect with each other in the magnetism detection element 30. As a result, a component of a magnetic field of the second branch wiring 75 that passes through the magnetism detection element 30 along the Z direction is in the opposite direction to a component of a magnetic field of the third branch wiring 77 that passes through the magnetism detection element 30 along the Z direction. In other words, these components weaken each other, thereby reducing the influence of the magnetic field of the second branch wiring 75 and the magnetic field of the third branch wiring 77 on the magnetism detection element 30.

Effects

According to the magnetism detection device 10 of the first embodiment, the following effects may be obtained.

(1-1) The magnetism detection device 10 includes the substrate 20 having the substrate front surface 21, the magnetism detection element 30 provided at the substrate front surface 21, the first terminal 81 and the second terminal 82 arranged on the substrate front surface 21 at a position separated from the magnetism detection element 30, and the front surface wiring 70 that is formed on the substrate front surface 21 and electrically connects the first terminal 81 and the second terminal 82. The front surface wiring 70 includes the first wiring 71 configured to apply a magnetic field including the first direction component MZ1 along the Z direction to the magnetism detection element 30 when a current flows from the first terminal 81 to the second terminal 82, and the second wiring 72 configured to apply a magnetic field including the second direction component MZ2, which is in the opposite direction to the first direction component MZ1, to the magnetism detection element 30 when a current flows from the first terminal 81 to the second terminal 82.

According to this configuration, when the current flows from the first terminal 81 to the second terminal 82, since the first direction component MZ1 of the magnetic field generated in the first wiring 71 and the second direction component MZ2 of the magnetic field generated in the second wiring 72 are in the opposite directions in the magnetism detection element 30, it is possible to reduce the influence of the magnetic field, which is caused by the front surface wiring 70, on the magnetism detection element 30. Therefore, it is possible to suppress a decrease in detection accuracy of the magnetism detection element 30.

(1-2) The first wiring 71 and the second wiring 72 are arranged on both sides of the magnetism detection element 30 so as to face each other. According to this configuration, when a current flows from the first terminal 81 to the second terminal 82, the directions in which a current flows through the first wiring 71 and the second wiring 72 are the same.

Then, since the first wiring 71 and the second wiring 72 are arranged on both sides of the magnetism detection element 30 so as to face each other, the first direction component MZ1 of the magnetic field generated in the first wiring 71 and the second direction component MZ2 of the magnetic field generated in the second wiring 72 are in the opposite directions in the magnetism detection element 30. Therefore, it is possible to reduce the influence of the magnetic field, which is caused by the front surface wiring 70, on the magnetism detection element 30.

(1-3) In a plan view, the distance D1 between the first wiring 71 and the magnetism detection element 30 in the Y direction is equal to the distance D2 between the second wiring 72 and the magnetism detection element 30 in the Y direction. According to this configuration, when a current flows from the first terminal 81 to the second terminal 82, a magnitude of the first direction component MZ1 of the magnetic field generated in the first wiring 71 and a magnitude of the second direction component MZ2 of the magnetic field generated in the second wiring 72 become closer to each other. As a result, it is possible to further reduce the influence of the magnetic field, which is caused by the front surface wiring 70, on the magnetism detection element 30.

(1-4) The width dimension W1 of the first wiring 71 and the width dimension W2 of the second wiring 72 are equal to each other. According to this configuration, since electric resistances in the first wiring 71 and the second wiring 72 may be brought closer to each other, a magnitude of a current flowing through the first wiring 71 and a magnitude of a current flowing through the second wiring 72 may be brought closer to each other. As a result, the magnitude of the first direction component MZ1 of the magnetic field generated in the first wiring 71 and the magnitude of the second direction component MZ2 of the magnetic field generated in the second wiring 72 become closer to each other. Therefore, it is possible to further reduce the influence of the magnetic field, which is caused by the front surface wiring 70, on the magnetism detection element 30.

(1-5) The front surface wiring 70 includes the first connection wiring 73 electrically connected to the first terminal 81, the second connection wiring 76 electrically connected to the second terminal 82, the first branch wiring 74 that branches from the first connection wiring 73 and is connected to the first wiring 71, the second branch wiring 75 that branches from the first connection wiring 73 and is connected to the second wiring 72, the third branch wiring 77 that branches from the second connection wiring 76 and is connected to the first wiring 71, and the fourth branch wiring 78 that branches from the second connection wiring 76 and is connected to the second wiring 72. In a plan view, the first wiring 71, the second wiring 72, the first branch wiring 74, the second branch wiring 75, the third branch wiring 77, and the fourth branch wiring 78 are formed to surround the entire circumference of the magnetism detection element 30.

According to this configuration, a direction of a current flowing through the first branch wiring 74 and a direction of a current flowing through the fourth branch wiring 78 are equal to each other in a plan view, and the first branch wiring 74 and the fourth branch wiring 78 are arranged on both sides of the magnetism detection element 30. Therefore, a Z-direction component of a magnetic field generated in the first branch wiring 74 and a Z-direction component of a magnetic field generated in the fourth branch wiring 78 are in the opposite directions in the magnetism detection element 30.

Further, a direction of a current flowing through the second branch wiring 75 and a direction of a current flowing through the third branch wiring 77 are equal to each other in a plan view, and the second branch wiring 75 and the third branch wiring 77 are arranged on both sides of the magnetism detection element 30. Therefore, a Z-direction component of a magnetic field generated in the second branch wiring 75 and a Z-direction component of a magnetic field generated in the third branch wiring 77 are in the opposite directions in the magnetism detection element 30. Therefore, it is possible to reduce the influence of the magnetic field, which is caused by the front surface wiring 70, on the magnetism detection element 30.

(1-6) The width dimension W4 of the first branch wiring 74 and the width dimension W8 of the fourth branch wiring 78 are equal to each other. According to this configuration, since electrical resistances in the first branch wiring 74 and the fourth branch wiring 78 may be brought closer to each other, a magnitude of a current flowing through the first branch wiring 74 and a magnitude of a current flowing through the fourth branch wiring 78 may be brought closer to each other. As a result, the magnitude of the Z-direction component of the magnetic field generated in the first branch wiring 74 and the magnitude of the Z-direction component of the magnetic field generated in the fourth branch wiring 78 become closer to each other. Therefore, it is possible to further reduce the influence of the magnetic field, which is caused by the front surface wiring 70, on the magnetism detection element 30.

(1-7) The width dimension W5 of the second branch wiring 75 and the width dimension W7 of the third branch wiring 77 are equal to each other. According to this configuration, since electrical resistances in the second branch wiring 75 and the third branch wiring 77 may be brought closer to each other, a magnitude of a current flowing through the second branch wiring 75 and a magnitude of a current flowing through the third branch wiring 77 may be brought closer to each other. As a result, the magnitude of the Z-direction component of the magnetic field generated in the second branch wiring 75 and the magnitude of the Z-direction component of the magnetic field generated in the third branch wiring 77 become closer to each other. Therefore, it is possible to further reduce the influence of the magnetic field, which is caused by the front surface wiring 70, on the magnetism detection element 30.

(1-8) The distance D4 between the first branch wiring 74 and the magnetism detection element 30 in the X direction and the distance D8 between the fourth branch wiring 78 and the magnetism detection element 30 in the X direction are equal to each other. According to this configuration, when a current flows from the first terminal 81 to the second terminal 82, the magnitude of the Z-direction component of the magnetic field generated in the first branch wiring 74 and the magnitude of the Z-direction component of the magnetic field generated in the fourth branch wiring 78 become closer to each other. As a result, it is possible to further reduce the influence of the magnetic field, which is caused by the front surface wiring 70, on the magnetism detection element 30.

(1-9) The distance D5 between the second branch wiring 75 and the magnetism detection element 30 in the X direction and the distance D7 between the third branch wiring 77 and the magnetism detection element 30 in the X direction are equal to each other. According to this configuration, when a current flows from the first terminal 81 to the second terminal 82, the magnitude of the Z-direction component of the magnetic field generated in the second branch wiring 75 and the magnitude of the Z-direction component of the magnetic field generated in the third branch wiring 77 become closer to each other. As a result, it is possible to further reduce the influence of the magnetic field, which is caused by the front surface wiring 70, on the magnetism detection element 30.

(1-10) The first wiring 71, the second wiring 72, the first branch wiring 74, the second branch wiring 75, the third branch wiring 77, and the fourth branch wiring 78 are provided adjacent to the magnetism detection element 30 in a plan view.

According to this configuration, in a plan view, a rectangular area formed by the first wiring 71, the second wiring 72, the first branch wiring 74, the second branch wiring 75, the third branch wiring 77, and the fourth branch wiring 78 becomes smaller. As a result, in a plan view, a space in the substrate 20 other than the rectangular shape formed by the first wiring 71, the second wiring 72, the first branch wiring 74, the second branch wiring 75, the third branch wiring 77, and the fourth branch wiring 78 may become larger. Therefore, it is possible to improve a degree of freedom in designing wiring patterns other than the front surface wiring 70.

Second Embodiment

A magnetism detection device 10 according to a second embodiment of the present disclosure will be described with reference to FIGS. 7 to 9. The magnetism detection device 10 of the second embodiment is different from the magnetism detection device 10 of the first embodiment in a configuration of a front surface wiring 90 and a positional relationship between the first terminal 81 and the second terminal 82. In the following description, the same components as in the first embodiment are denoted by the same reference numerals, and the explanation thereof will not be repeated.

Figure 7:
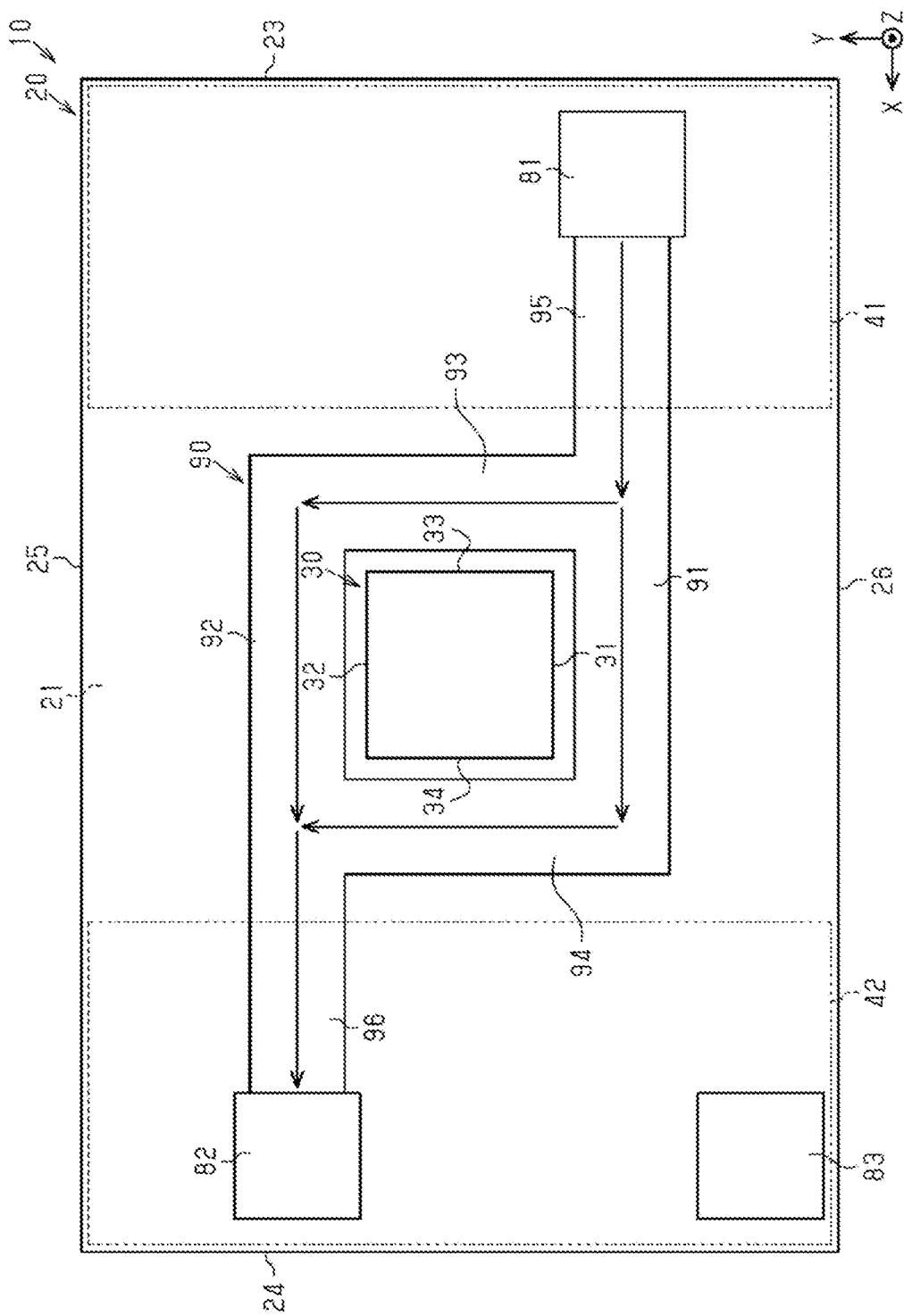
FIG. 7 is a schematic plan view of a magnetism detection device according to a second embodiment of the present disclosure.

FIG. 7 shows a planar structure of the magnetism detection device 10 of the second embodiment. FIG. 8 is a diagram in which the magnetism detection element 30, the front surface wiring 90, the first terminal 81, and the second terminal 82 in FIG. 7 are extracted. FIG. 9 is a cross-sectional view of the magnetism detection device 10, which is taken along line F9-F9 in FIG. 8, showing a relationship of magnetic fields between a third wiring 93 and a fourth wiring 94 on one hand, which will be described later, and the magnetism detection element 30 on the other hand.

As shown in FIG. 7, similar to the first embodiment, the first terminal 81 and the second terminal 82 of the second embodiment are arranged in a distributed manner on both sides of the magnetism detection element 30 in the X direction. Here, the X direction corresponds to the "third direction."

The first terminal 81 and the second terminal 82 of the second embodiment are arranged at different positions in the Y direction, as compared with the first embodiment. The position of the first terminal 81 in the Y direction and the position of the second terminal 82 in the Y direction are different from each other. More specifically, the first terminal 81 is disposed closer to the fourth substrate side surface 26 with respect to the magnetism detection element 30 in the Y direction. The second terminal 82 is disposed closer to the third substrate side surface 25 with respect to the magnetism detection element 30 in the Y direction.

Figure 8:
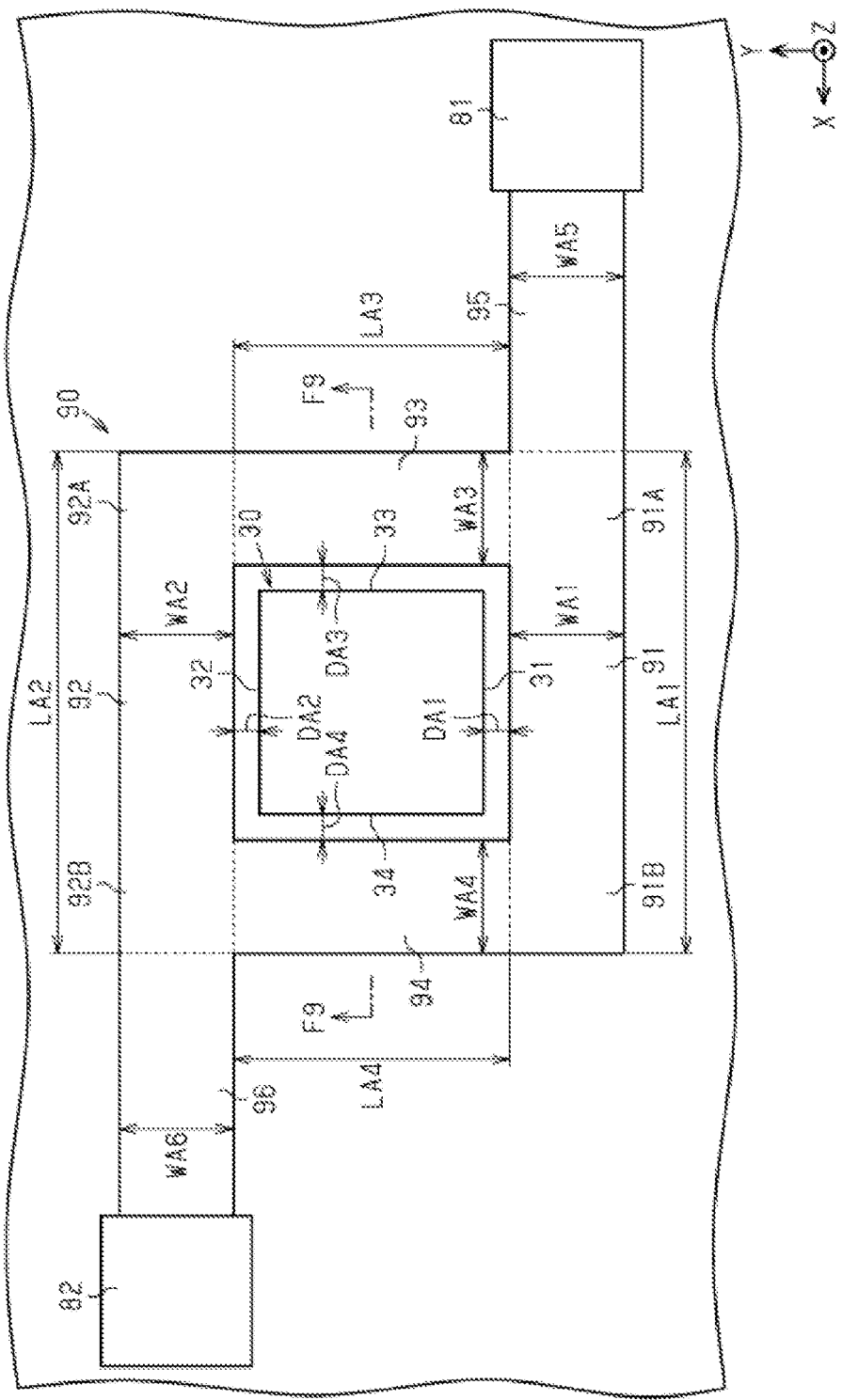
FIG. 8 is an enlarged plan view of a magnetism detection element, a front surface wiring, a first terminal, and a second terminal of FIG. 7.

As shown in FIG. 8, the front surface wiring 90 includes a first wiring 91, a second wiring 92, a third wiring 93, a fourth wiring 94, a first connection wiring 95, and a second connection wiring 96. In an example, these wirings 91 to 96 are integrally formed. The front surface wiring 90 is made of the same material as the front surface wiring 70 of the first embodiment. In FIG. 8, these wirings 91 to 96 are partitioned by broken lines for the sake of convenience.

The positional relationship of the first wiring 91 and the second wiring 92 with respect to the magnetism detection element 30 is the same as that of the first wiring 71 and the second wiring 72 of the first embodiment. That is, the first wiring 91 and the second wiring 92 are arranged on both sides of the magnetism detection element 30 in the Y direction so as to face each other in a plan view. Here, the Y direction corresponds to the "fourth direction."

Further, a relationship between width dimensions WA1 and WA2 and length dimensions LA1 and LA2 of the first wiring 91 and the second wiring 92 is the same as the relationship between the width dimensions W1 and W2 and the length dimensions L1 and L2 (both shown in FIG. 4) of the first wiring 71 and the second wiring 72 of the first embodiment. Further, in a method of dividing the front surface wiring 90 shown in FIG. 8, the length dimension LA1 of the first wiring 91 is larger than the length dimension L1 of the first wiring 71. The length dimension LA2 of the second wiring 92 is larger than the length dimension L2 of the second wiring 72.

The first wiring 91 includes a first end 91A and a second end 91B as both ends in the X direction. The first end 91A of the first wiring 91 is an end, which is closer to the first terminal 81, of both ends of the first wiring 91 in the X direction. The second end 91B of the first wiring 91 is an end, which is farther from the first terminal 81, of both ends of the first wiring 91 in the X direction.

The second wiring 92 includes a first end 92A and a second end 92B as both ends in the X direction. The first end 92A of the second wiring 92 is an end, which is closer to the first terminal 81, of both ends of the second wiring 92 in the X direction. The second end 92B of the second wiring 92 is an end, which is farther from the first terminal 81, of both ends of the second wiring 92 in the X direction. The position of the first end 92A of the second wiring 92 in the X direction is the same as the position of the first end 91A of the first wiring 91 in the X direction. The position of the second end 92B of the second wiring 92 in the X direction is the same as the position of the second end 91B of the first wiring 91 in the X direction.

The third wiring 93 and the fourth wiring 94 extend in a direction different from a direction (X direction) in which both the first wiring 91 and the second wiring 92 extend in a plan view. In the second embodiment, both the third wiring 93 and the fourth wiring 94 extend in a direction (Y direction) orthogonal to a direction in which both the first wiring 91 and the second wiring 92 extend in a plan view. In this way, the third wiring 93 and the fourth wiring 94 are parallel to each other.

The third wiring 93 is disposed closer to the first terminal 81 with respect to the magnetism detection element 30 in the X direction. The fourth wiring 94 is disposed closer to the second terminal 82 with respect to the magnetism detection element 30 in the X direction. In this way, the third wiring 93 and the fourth wiring 94 are arranged on both sides of the magnetism detection element 30 in the X direction so as to face each other.

The third wiring 93 connects the first end 91A of the first wiring 91 and the first end 92A of the second wiring 92. The fourth wiring 94 connects the second end 91B of the first wiring 91 and the second end 92B of the second wiring 92. As shown in FIG. 7, in a plan view, the first wiring 91, the second wiring 92, the third wiring 93, and the fourth wiring 94 are formed to surround the magnetism detection element 30.

A width dimension WA3 of the third wiring 93 may be equal to the width dimension WA1 of the first wiring 91. The width dimension WA3 of the third wiring 93 may be equal to the width dimension WA2 of the second wiring 92. A width dimension WA4 of the fourth wiring 94 may be equal to the width dimension WA1 of the first wiring 91. The width dimension WA4 of the fourth wiring 94 may be equal to the width dimension WA2 of the second wiring 92. Therefore, the width dimension WA3 of the third wiring 93 and the width dimension WA4 of the fourth wiring 94 may be equal to each other. Further, a length dimension LA3 of the third wiring 93 and a length dimension LA4 of the fourth wiring 94 may be equal to each other.

The first connection wiring 95 is electrically connected to the first terminal 81. An electrical connection structure between the first connection wiring 95 and the first terminal 81 is the same as, for example, an electrical connection structure between the first connection wiring 73 and the first terminal 81 in the first embodiment.

The first connection wiring 95 is connected to the first end 91A of the first wiring 91. In this way, the first connection wiring 95 and the third wiring 93 are connected to the first end 91A of the first wiring 91. The first connection wiring 95 extends from the first end 91A of the first wiring 91 in the X direction.

A width dimension WA5 of the first connection wiring 95 may be equal to the width dimension WA1 of the first wiring 91. The width dimension WA5 of the first connection wiring 95 may be equal to the width dimension WA2 of the second wiring 92. The width dimension WA5 of the first connection wiring 95 may be equal to the width dimension WA3 of the third wiring 93.

The second connection wiring 96 is electrically connected to the second terminal 82. An electrical connection structure between the second connection wiring 96 and the second terminal 82 is the same as, for example, an electrical connection structure between the second connection wiring 76 and the second terminal 82 in the first embodiment.

The second connection wiring 96 is connected to the second end 92B of the second wiring 92. In this way, the second connection wiring 96 and the fourth wiring 94 are connected to the second end 92B of the second wiring 92. The second connection wiring 96 extends from the second end 92B of the second wiring 92 in the X direction.

A width dimension WA6 of the second connection wiring 96 may be equal to the width dimension WA1 of the first wiring 91. The width dimension WA6 of the second connection wiring 96 may be equal to the width dimension WA2 of the second wiring 92. The width dimension WA6 of the second connection wiring 96 may be equal to the width dimension WA4 of the fourth wiring 94. The width dimension WA6 of the second connection wiring 96 may be equal to the width dimension WA5 of the first connection wiring 95.

When a current flows from the first terminal 81 to the second terminal 82, the width dimension, length dimension, and thickness of each of the first to fourth wirings 91 to 94 of the front surface wiring 90 are set such that an amount of current flowing in the order of the first wiring 91 and the fourth wiring 94 is equal to an amount of current flowing in the order of the third wiring 93 and the second wiring 92. In an example, as described above, the width dimension WA1 and the length dimension LA1 of the first wiring 91 are equal to the width dimension WA2 and the length dimension LA2 of the second wiring 92, and the width dimension WA3 and the length dimension LA3 of the third wiring 93 are equal to the width dimension WA4 and the length dimension LA4 of the fourth wiring 94. Further, the thickness of the front surface wiring 90 is constant. As a result, since the resistance values in the first wiring 91 and the fourth wiring 94 become equal to the resistance values in the third wiring 93 and the second wiring 92, the amount of current flowing in the order of the first wiring 91 and the fourth wiring 94 becomes equal to the amount of current flowing in the order of the third wiring 93 and the second wiring 92.

In an example, the width dimension of each of the wirings 91 to 94 is several tens of μm (for example, 30 μm). The width dimension of each of the wirings 91 to 94 is set according to the amount of current flowing from the first terminal 81 to the second terminal 82, for example.

In a case where the amount of current flowing in the order of the first wiring 91 and the fourth wiring 94 may be equal to the amount of current flowing in the order of the third wiring 93 and the second wiring 92, the width dimension, length dimension, and thickness of each of the first to fourth wirings 91 to 94 of the front surface wiring 90 may be changed as appropriate.

The positional relationship between the magnetism detection element 30 and the front surface wiring 90 is as follows. A distance DA1 between the magnetism detection element 30 and the first wiring 91 in the Y direction may be equal to a distance DA2 between the magnetism detection element 30 and the second wiring 92 in the Y direction.

A distance DA3 between the magnetism detection element 30 and the third wiring 93 in the X direction may be equal to a distance DA4 between the magnetism detection element 30 and the fourth wiring 94 in the X direction. The distance DA1 may be equal to the distance DA3. In an example, the distance DA1 may be equal to the distance DA4.

The distance DA2 may be equal to the distance DA3. The distance DA2 may be equal to the distance DA4. In the example of FIG. 8, the distances DA1 to DA4 are equal to each other. Next, a relationship between a magnetic field of the front surface wiring 90 and the magnetism detection element 30 will be described.

Although not shown, as in the first embodiment, the first wiring 91 and the second wiring 92 are arranged on both sides of the magnetism detection element 30 in the Y direction, and when a current flows from the first terminal 81 to the second terminal 82, a current flows through the first wiring 91 and the second wiring 92 in the same direction. Therefore, when the current flows from the first terminal 81 to the second terminal 82, a magnetic field in a first magnetic direction M1 is generated in the first wiring 91. Then, when the current flows from the first terminal 81 to the second terminal 82, a magnetic field in a second magnetic direction M2, which is the same direction as the first magnetic direction M1, is generated in the second wiring 92. Since the first wiring 91 and the second wiring 92 are arranged on both sides of the magnetism detection element 30 in the Y direction, the magnetic field of the first wiring 91 and the magnetic field of the second wiring 92 are in a direction in which the first magnetic direction M1 and the second magnetic direction M2 intersect with each other in the magnetism detection element 30.

As a result, a first direction component MZ1 along the Z direction in a magnetic field passing through the magnetism detection element 30 in the magnetic field of the first wiring 91 is in the opposite direction to a second direction component MZ2 along the Z direction in a magnetic field passing through the magnetism detection element 30 in the magnetic field of the second wiring 92. That is, the first direction component MZ1 and the second direction component MZ2 weaken each other, so that the influence of the magnetic field of the first wiring 91 and the magnetic field of the second wiring 92 on the magnetism detection element 30 may be reduced.

Figure 9:
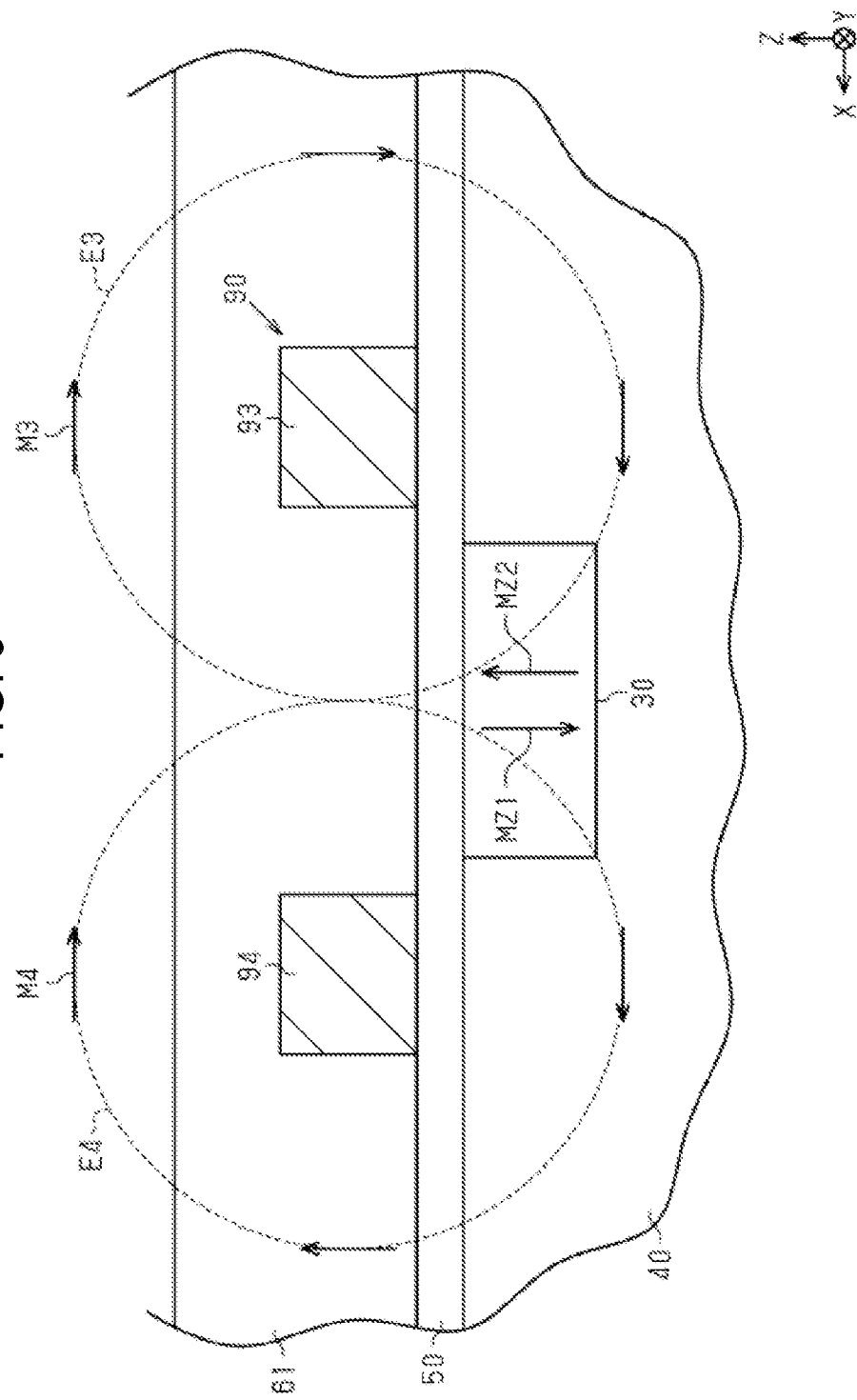
FIG. 9 is a schematic cross-sectional view of the magnetism detection device, which is taken along line F9-F9 in FIG. 8.

As shown in FIG. 9, the third wiring 93 and the fourth wiring 94 are arranged on both sides of the magnetism detection element 30 in the X direction, and when a current flows from the first terminal 81 to the second terminal 82, a current flows through the third wiring 93 and the fourth wiring 94 in the same direction. Therefore, when the current flows from the first terminal 81 to the second terminal 82, a third magnetic field E3 in a third magnetic direction M3 is generated in the third wiring 93. Then, when the current flows from the first terminal 81 to the second terminal 82, a fourth magnetic field E4 in a fourth magnetic direction M4, which is the same direction as the third magnetic direction M3, is generated in the fourth wiring 94. Since the third wiring 93 and the fourth wiring 94 are arranged on both sides of the magnetism detection element 30 in the X direction, the third magnetic field E3 and the fourth magnetic field E4 are in a direction in which the third magnetic direction M3 and the fourth magnetic direction M4 intersect with each other in the magnetism detection element 30.

As a result, a component along the Z direction in a magnetic field passing through the magnetism detection element 30 in the third magnetic field E3 is directed upward in FIG. 9, and thus becomes the second direction component MZ2. On the other hand, the component of the fourth magnetic field E4 that passes through the magnetism detection element 30 along the Z direction is directed downward in FIG. 9, and thus becomes the first direction component MZ1. In other words, the first direction component MZ1 and the second direction component MZ2, which are in the opposite directions, weaken each other, such that the influence of the third magnetic field E3 and the fourth magnetic field E4 on the magnetism detection element 30 may be reduced.

Effects

According to the magnetism detection device 10 of the second embodiment, the following effects may be obtained.

(2-1) The front surface wiring 90 includes the first wiring 91 configured to apply a magnetic field including the first direction component MZ1 along the Z direction to the magnetism detection element 30 when a current flows from the first terminal 81 to the second terminal 82, and the second wiring 92 configured to apply a magnetic field including the second direction component MZ2, which is in the opposite direction to the first direction component MZ1, to the magnetism detection element 30 when a current flows from the first terminal 81 to the second terminal 82.

According to this configuration, when the current flows from the first terminal 81 to the second terminal 82, since the first direction component MZ1 of the magnetic field generated in the first wiring 91 and the second direction component MZ2 of the magnetic field generated in the second wiring 92 are in the opposite directions in the magnetism detection element 30, it is possible to reduce the influence of the magnetic field, which is caused by the front surface wiring 90, on the magnetism detection element 30. Therefore, it is possible to suppress a decrease in detection accuracy of the magnetism detection element 30.

(2-2) The front surface wiring 90 includes the third wiring 93 configured to apply the third magnetic field E3 including the second direction component MZ2 to the magnetism detection element 30 when a current flows from the first terminal 81 to the second terminal 82, and the fourth wiring 94 configured to apply the fourth magnetic field E4 of the first direction component MZ1, which is in the opposite direction to the second direction component MZ2, to the magnetism detection element 30 when a current flows from the first terminal 81 to the second terminal 82. Both the third wiring 93 and the fourth wiring 94 extend in a direction different from the direction in which both the first wiring 91 and the second wiring 92 extend in a plan view.

According to this configuration, when the current flows from the first terminal 81 to the second terminal 82, the second direction component MZ2 of the third magnetic field E3 and the first direction component MZ1 of the fourth magnetic field E4 are in the opposite directions in the magnetism detection element 30, such that the influence of the magnetic field, which is caused by the front surface wiring 90, on the magnetism detection element 30 may be further reduced. Therefore, it is possible to further suppress a decrease in detection accuracy of the magnetism detection element 30.

(2-3) The distance DA1 between the first wiring 91 and the magnetism detection element 30 in the Y direction is equal to the distance DA2 between the second wiring 92 and the magnetism detection element 30 in the Y direction. The distance DA3 between the third wiring 93 and the magnetism detection element 30 in the X direction is equal to the distance DA4 between the fourth wiring 94 and the magnetism detection element 30 in the X direction.

According to this configuration, when a current flows from the first terminal 81 to the second terminal 82, the magnitude of the first direction component MZ1 of the magnetic field generated in the first wiring 91 and the magnitude of the second direction component MZ2 of the magnetic field generated in the second wiring 92 become closer to each other. As a result, it is possible to further reduce the influence of the magnetic field, which is caused by the front surface wiring 90, on the magnetism detection element 30. Further, when the current flows from the first terminal 81 to the second terminal 82, the magnitude of the second direction component MZ2 of the magnetic field generated in the third wiring 93 and the magnitude of the first direction component MZ1 of the magnetic field generated in the fourth wiring 94 become closer to each other. As a result, it is possible to further reduce the influence of the magnetic field, which is caused by the front surface wiring 90, on the magnetism detection element 30.

(2-4) The width dimension WA3 of the third wiring 93 and the width dimension WA4 of the fourth wiring 94 are equal to each other. According to this configuration, since the electrical resistances in the third wiring 93 and the fourth wiring 94 may be brought closer to each other, the magnitude of a current flowing through the third wiring 93 and the magnitude of a current flowing through the fourth wiring 94 may be brought closer to each other. As a result, the magnitude of the second direction component MZ2 of the third magnetic field E3 and the magnitude of the first direction component MZ1 of the fourth magnetic field E4 become closer to each other. Therefore, it is possible to further reduce the influence of the magnetic field, which is caused by the front surface wiring 90, on the magnetism detection element 30.

(2-5) The width dimension WA1 of the first wiring 91 and the width dimension WA2 of the second wiring 92 are equal to each other. According to this configuration, since the electrical resistances in the first wiring 91 and the second wiring 92 may be brought closer to each other, a magnitude of a current flowing through the first wiring 91 and a magnitude of a current flowing through the second wiring 92 may be brought closer to each other. As a result, a magnitude of the first direction component MZ1 of the magnetic field generated in the first wiring 91 and a magnitude of the second direction component MZ2 of the magnetic field generated in the second wiring 92 become closer to each other. Therefore, it is possible to further reduce the influence of the magnetic field, which is caused by the front surface wiring 90, on the magnetism detection element 30.

Third Embodiment

A magnetism detection device 10 according to a third embodiment of the present disclosure will be described with reference to FIG. 10. The magnetism detection device 10 of the third embodiment is different from the magnetism detection device 10 of the first embodiment in a configuration of a front surface wiring 100. In the following description, the same components as in the first embodiment are denoted by the same reference numerals, and the explanation thereof will not be repeated.

Figure 10:
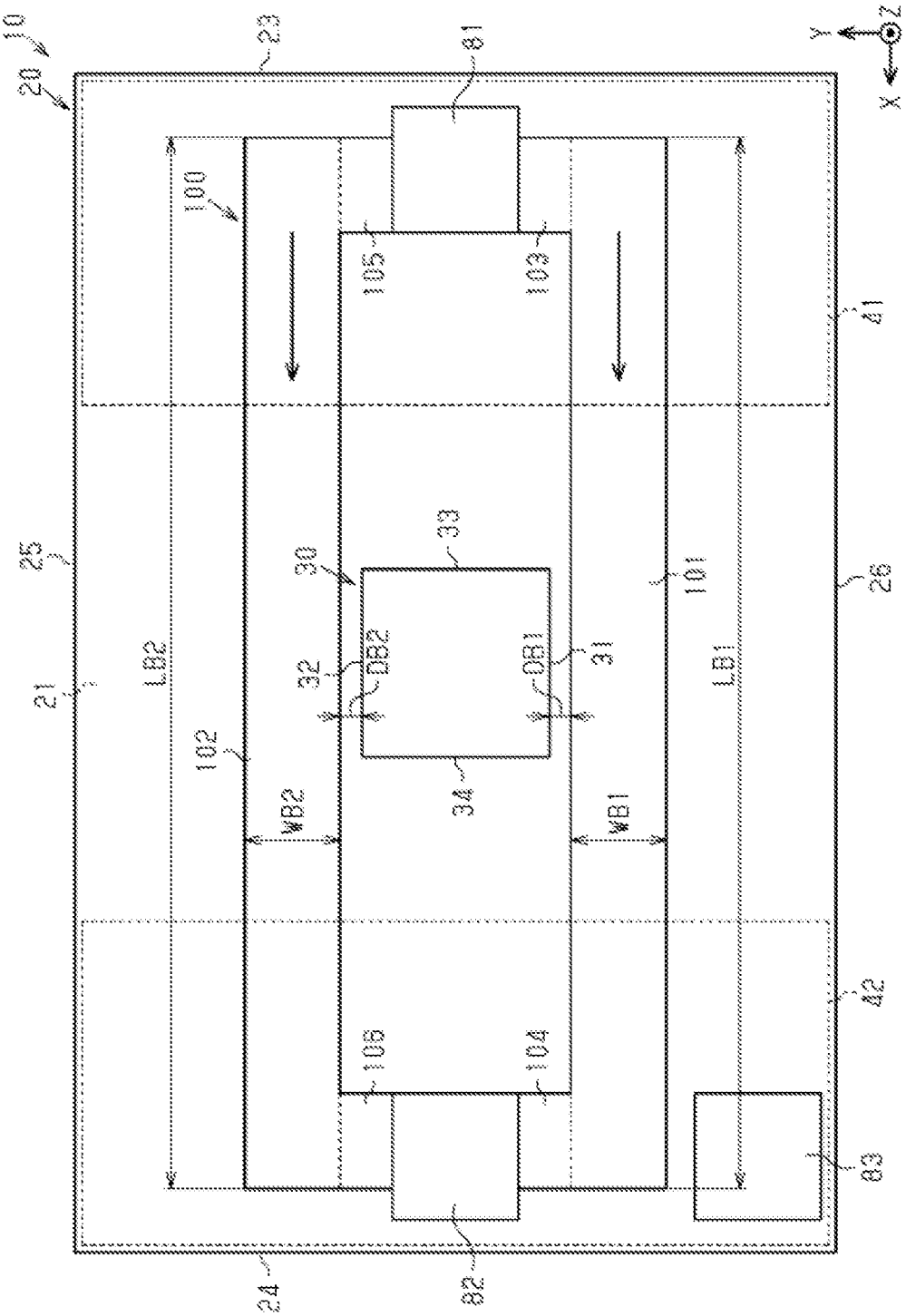
FIG. 10 is a schematic plan view of a magnetism detection device according to a third embodiment of the present disclosure.

As shown in FIG. 10, the front surface wiring 100 includes a first wiring 101, a second wiring 102, a first end connection part 103, a second end connection part 104, a third end connection part 105, and a four end connection part 106. In an example, these wirings 101 and 102 and these connection parts 103 to 106 are integrally formed. The front surface wiring 100 is made of the same material as the front surface wiring 70 of the first embodiment. In FIG. 10, these wirings 101 and 102 and the connection parts 103 to 106 are partitioned by broken lines for the sake of convenience.

The positional relationship of the first wiring 101 and the second wiring 102 with respect to the magnetism detection element 30 is the same as that of the first wiring 71 and the second wiring 72 of the first embodiment. That is, the first wiring 101 and the second wiring 102 are arranged on both sides of the magnetism detection element 30 in the Y direction in a plan view so as to face each other. Here, the Y direction corresponds to the "fourth direction."

Further, a relationship between width dimensions WB1 and WB2 of the first wiring 101 and the second wiring 102 is the same as the relationship between the width dimensions W1 and W2 of the first wiring 71 and the second wiring 72 in the first embodiment.

Both the first wiring 101 and the second wiring 102 extend in the X direction from the first terminal 81 to the second terminal 82. Therefore, length dimensions LB1 and LB2 of the first wiring 101 and the second wiring 102 are longer than the length dimensions L1 and L2 of the first wiring 71 and the second wiring 72 of the first embodiment. The length dimension LB1 of the first wiring 101 and the length dimension LB2 of the second wiring 102 may be equal to each other. A distance DB1 between the magnetism detection element 30 and the first wiring 101 in the Y direction may be equal to a distance DB2 between the magnetism detection element 30 and the second wiring 102 in the Y direction.

The first end connection part 103 is electrically connected to the first terminal 81. An electrical connection structure between the first end connection part 103 and the first terminal 81 is the same as the electrical connection structure between the first connection wiring 73 and the first terminal 81 in the first embodiment.

The first end connection part 103 is connected to an end, which is closer to the first terminal 81, of both ends of the first wiring 101 in the X direction. The first end connection part 103 extends in the Y direction from the end of the first wiring 101 that is closer to the first terminal 81.

The second end connection part 104 is electrically connected to the second terminal 82. An electrical connection structure between the second end connection part 104 and the second terminal 82 is the same as the electrical connection structure between the second connection wiring 76 and the second terminal 82 in the first embodiment.

The second end connection part 104 is connected to an end, which is closer to the second terminal 82, of both ends of the first wiring 101 in the X direction. The second end connection part 104 extends in the Y direction from the end of the first wiring 101 that is closer to the second terminal 82.

The third end connection part 105 is electrically connected to the first terminal 81. An electrical connection structure between the third end connection part 105 and the first terminal 81 is the same as the electrical connection structure between the first connection wiring 73 and the first terminal 81 in the first embodiment.

The third end connection part 105 is connected to an end, which is closer to the first terminal 81, of both ends of the second wiring 102 in the X direction. The third end connection part 105 extends in the Y direction from the end of the second wiring 102 that is closer to the first terminal 81.

The fourth end connection part 106 is electrically connected to the second terminal 82. An electrical connection structure between the fourth end connection part 106 and the second terminal 82 is the same as the electrical connection structure between the second connection wiring 76 and the second terminal 82 in the first embodiment.

The fourth end connection part 106 is connected to an end, which is closer to the second terminal 82, of both ends of the second wiring 102 in the X direction. The fourth end connection part 106 extends in the Y direction from the end of the second wiring 102 that is closer to the second terminal 82. According to the magnetism detection device 10 of the third embodiment, effects similar to the effects (1-1) to (1-4) of the first embodiment may be obtained.

Fourth Embodiment

A magnetism detection device 10 according to a fourth embodiment will be described with reference to FIGS. 11 and 12. The magnetism detection device 10 of the fourth embodiment is different from the magnetism detection device 10 of the first embodiment in configurations of a substrate 110, a magnetism detection element 120, and a front surface wiring 130. In the following description, the same components as in the first embodiment are denoted by the same reference numerals, and the explanation thereof will not be repeated.

Figure 11:
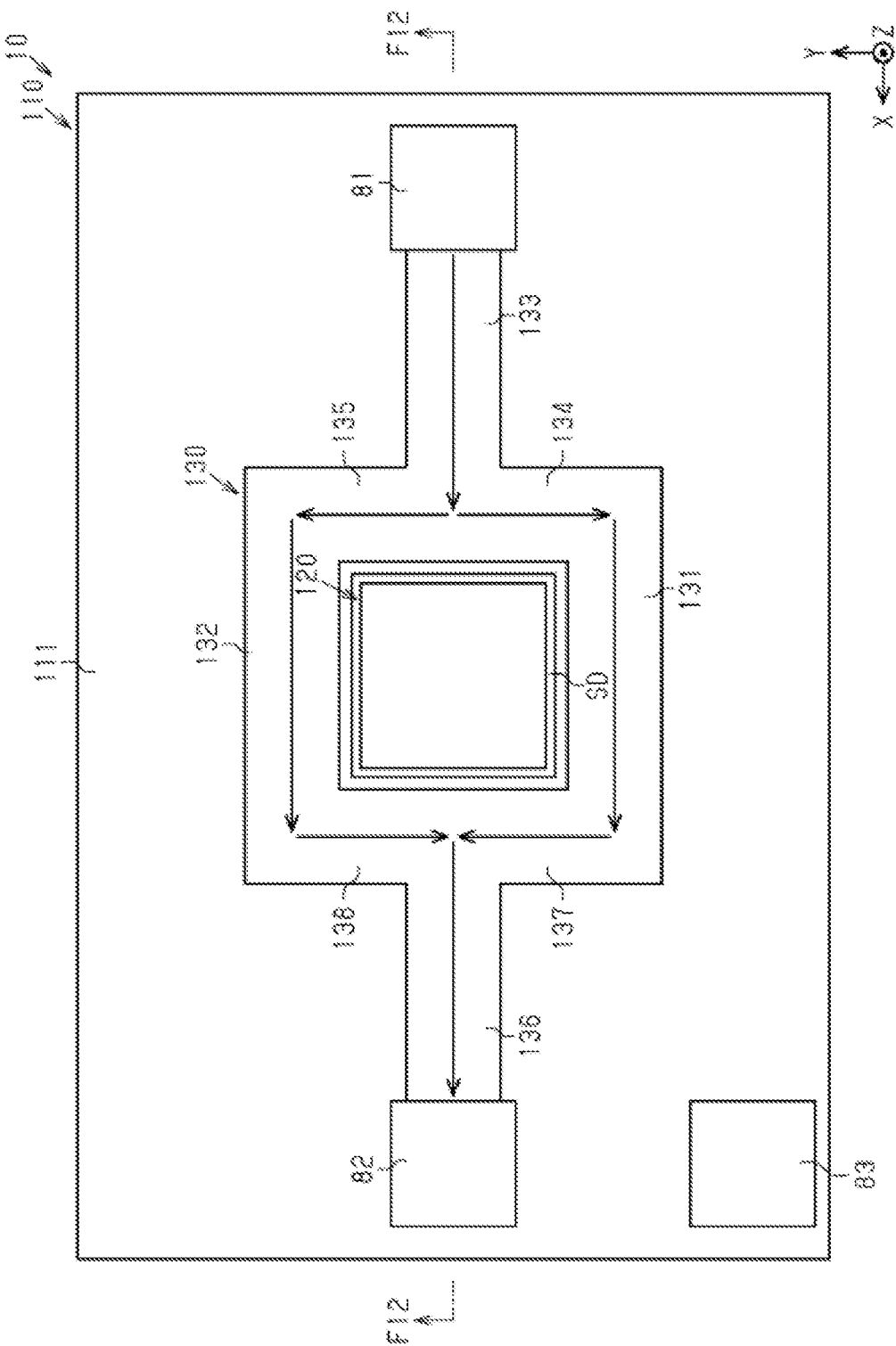
FIG. 11 is a schematic plan view of a magnetism detection device according to a fourth embodiment of the present disclosure.

As shown in FIG. 11, the magnetism detection device 10 of the fourth embodiment includes a substrate 110 made of, for example, glass epoxy resin. The substrate 110 is not provided with the driver element 41 and the protection element 42 (see FIG. 1). The substrate 110 includes a substrate front surface 111 and a substrate back surface 112 (see FIG. 12) facing opposite sides in the Z direction.

The magnetism detection element 120 is formed as a semiconductor chip. The magnetism detection element 120 is, for example, a Hall element. As shown in FIG. 12, the magnetism detection element 120 is bonded to a mounting pattern 113, which is provided at the substrate front surface 111 of the substrate 110, by a bonding material SD. The mounting pattern 113 is formed of, for example, a metal layer. The metal layer is made of a material containing, for example, Cu. In this way, the magnetism detection element 120 is mounted on the substrate front surface 111.

Figure 12:
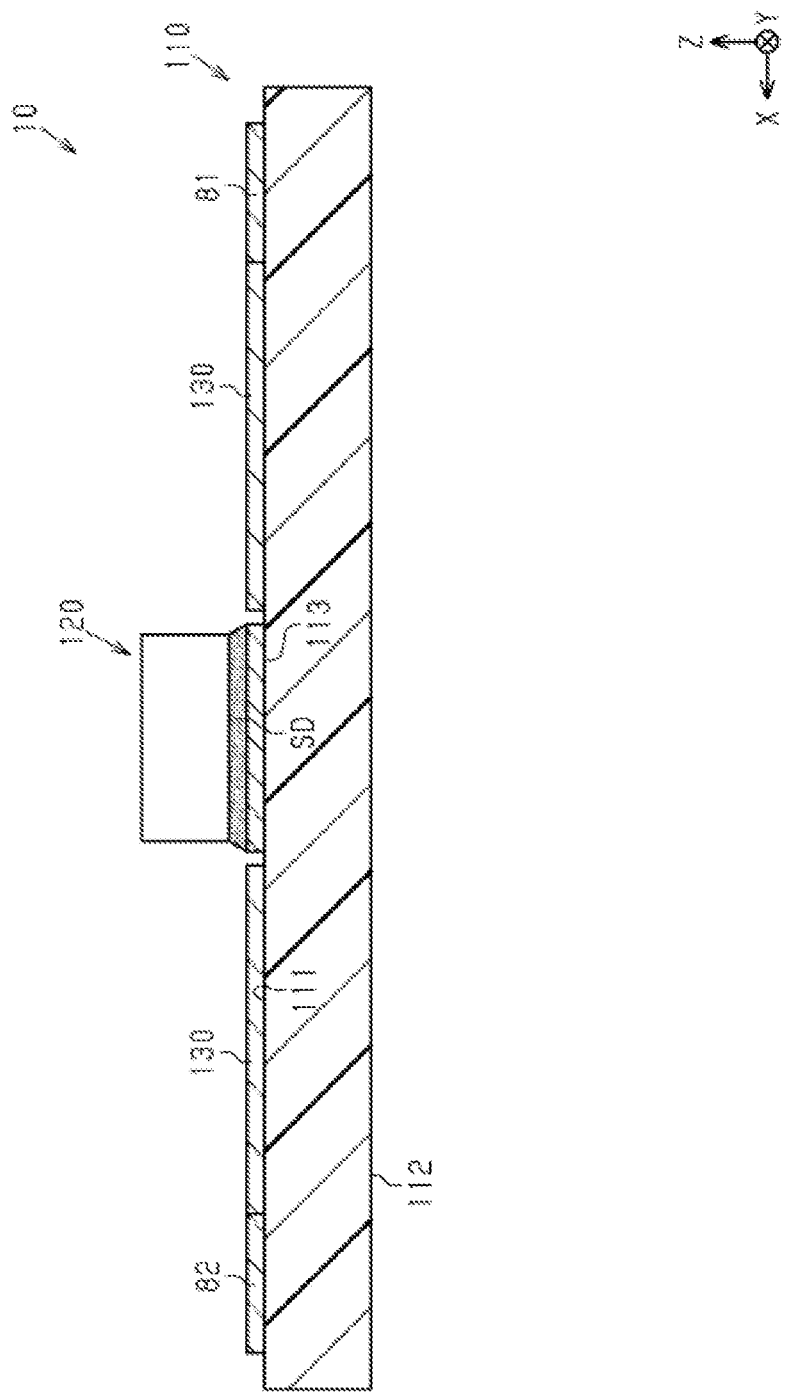
FIG. 12 is a schematic cross-sectional view of the magnetism detection device, which is taken along line F12-F12 in FIG. 11.

As shown in FIG. 12, the front surface wiring 130 is formed on the substrate front surface 111. As shown in FIG. 11, a shape of the front surface wiring 130 in a plan view is the same as the shape of the front surface wiring 70 (see FIG. 1) in a plan view of the first embodiment. The front surface wiring 130 is made of a material containing, for example, Cu. In an example, the front surface wiring 130 is made of copper foil.

The front surface wiring 130 includes a first wiring 131, a second wiring 132, a first connection wiring 133, a first branch wiring 134, a second branch wiring 135, a second connection wiring 136, a third branch wiring 137, and a fourth branch wiring 138. The first wiring 131 corresponds to the first wiring 71 of the front surface wiring 70 of the first embodiment, and the second wiring 132 corresponds to the second wiring 72 of the front surface wiring 70. The first connection wiring 133 corresponds to the first connection wiring 73 of the front surface wiring 70, the first branch wiring 134 corresponds to the first branch wiring 74 of the front surface wiring 70, and the second branch wiring 135 corresponds to the second branch wiring 75 of the front surface wiring 70. The second connection wiring 136 corresponds to the second connection wiring 76 of the front surface wiring 70, the third branch wiring 137 corresponds to the third branch wiring 77 of the front surface wiring 70, and the fourth branch wiring 138 corresponds to the fourth branch wiring 78 of the front surface wiring 70.

As shown in FIG. 12, the front surface wiring 130 is arranged to be shifted from the magnetism detection element 120 in the Z direction. More specifically, the front surface wiring 130 is arranged closer to the substrate 110 than the magnetism detection element 120 in the Z direction. According to the magnetism detection device 10 of the fourth embodiment, effects similar to the effects (1-1) to (1-9) of the first embodiment may be obtained.

Modifications

The above-described embodiments may be modified and implemented as follows. The following modifications may be combined with each other unless technically contradictory. Further, the first to fourth embodiments may be combined with each other unless technically contradictory.

Figure 13:
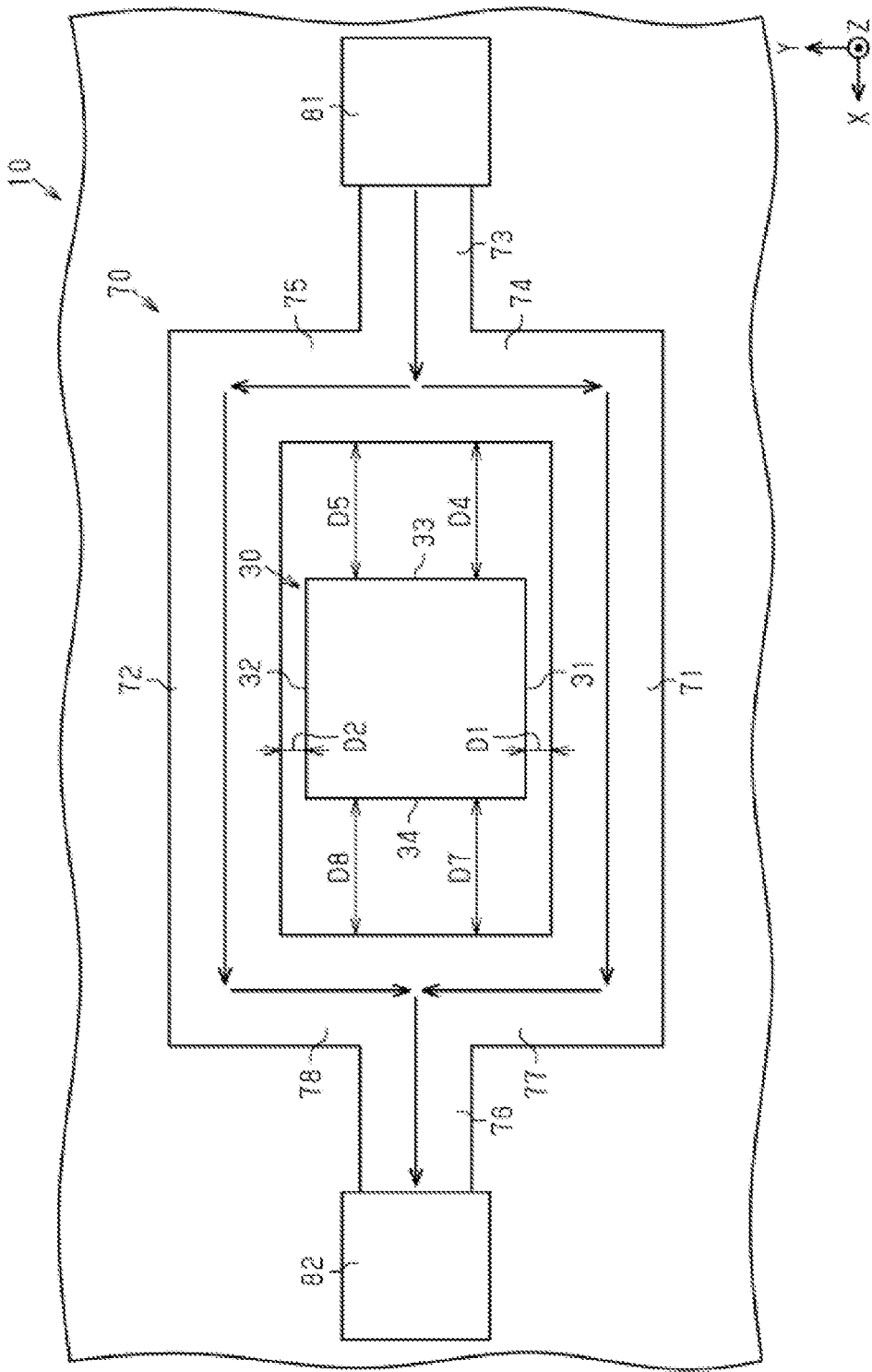
FIG. 13 is an enlarged plan view of a magnetism detection element, a front surface wiring, a first terminal, and a second terminal of a magnetism detection device according to a modification.

In the first embodiment, the position in the X direction of each of the first branch wiring 74, the second branch wiring 75, the third branch wiring 77, and the fourth branch wiring 78 in the front surface wiring 70 may be arbitrarily modified. In an example, as shown in FIG. 13, the distance D4 between the first branch wiring 74 and the magnetism detection element 30 in the X direction, the distance D5 between the second branch wiring 75 and the magnetism detection element 30 in the X direction, the distance D7 between the third branch wiring 77 and the magnetism detection element 30 in the X direction, and the distance D8 between the fourth branch wiring 78 and the magnetism detection element 30 in the X direction are each larger than both the distance D1 between the first wiring 71 and the magnetism detection element 30 in the Y direction and the distance D2 between the second wiring 72 and the magnetism detection element 30 in the Y direction. In this case, the distance D1 may be equal to the distance D2. The distance D4 may be equal to the distance D8. The distance D5 may be equal to the distance D7. The distance D4 may be equal to the distance D5. The distance D7 may be equal to the distance D8. Further, although not shown, each of the distances D4, D5, D7, and D8 may be smaller than the distances D1 and D2. In other words, the distances D1 and D2 may be larger than the distances D4, D5, D7, and D8.

Figure 14:
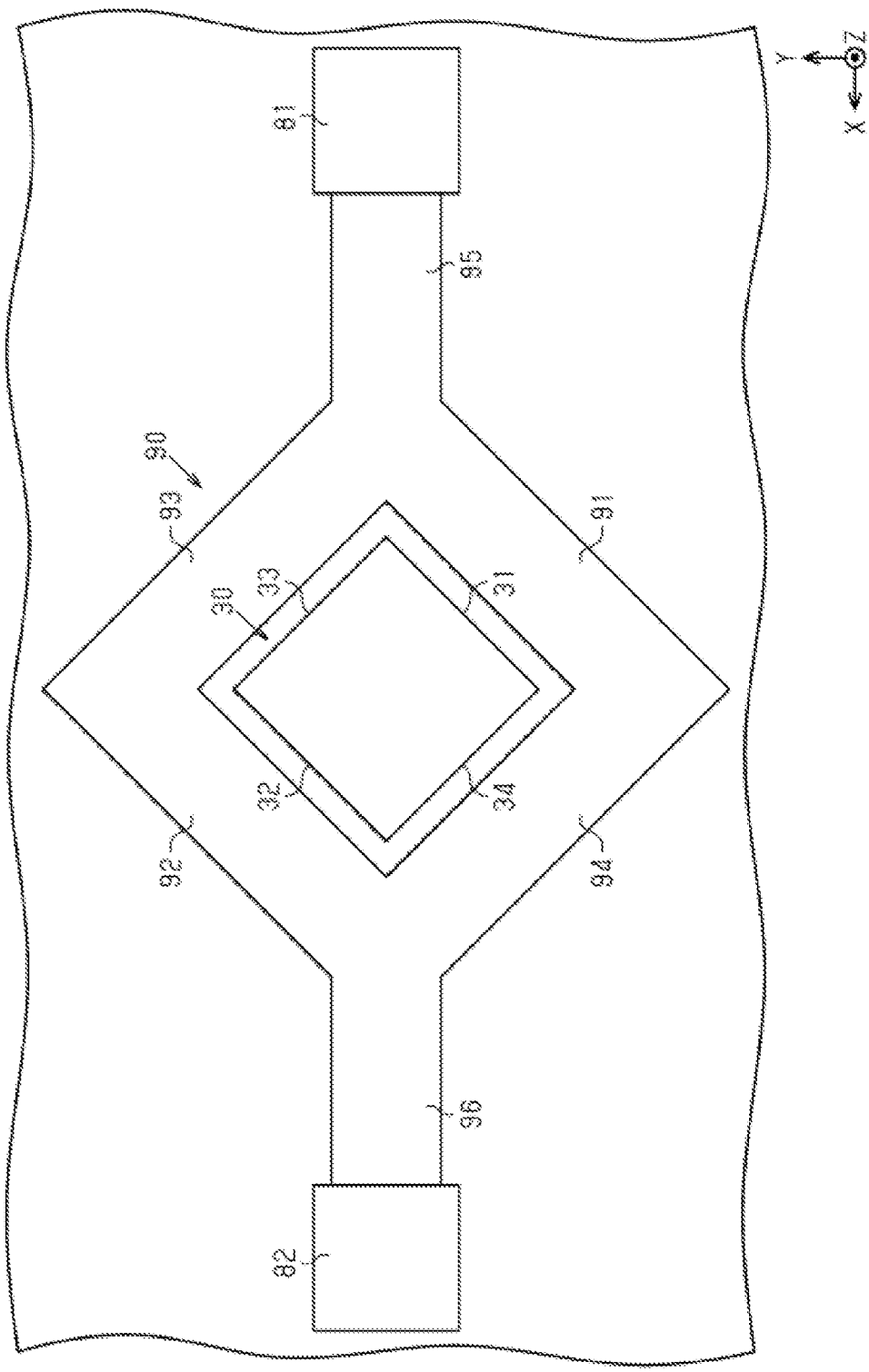
FIG. 14 is an enlarged plan view of a magnetism detection element, a front surface wiring, a first terminal, and a second terminal of a magnetism detection device according to a modification.

In each embodiment, a shape of a portion, which surrounds the magnetism detection element 30, of each of the front surface wirings 70, 90, and 100 in a plan view may be arbitrarily modified. In an example, as shown in FIG. 14, both the first wiring 91 and the second wiring 92 may extend in a direction (fifth direction), which intersects both the X direction and the Y direction, among the directions orthogonal to the Z direction in a plan view. In this case, the first wiring 91 and the second wiring 92 may be arranged in a sixth direction orthogonal to the fifth direction in a plan view. That is, the first wiring 91 and the second wiring 92 are arranged to face each other on both sides of the magnetism detection element 30 in the sixth direction.

The third wiring 93 and the fourth wiring 94 may extend in a direction (seventh direction), which intersects the X direction, the Y direction, and the fifth direction, among the directions orthogonal to the Z direction in a plan view. In this case, the third wiring 93 and the fourth wiring 94 may be arranged in an eighth direction orthogonal to the seventh direction in a plan view. That is, the third wiring 93 and the fourth wiring 94 are arranged on both sides of the magnetism detection element 30 in the eighth direction so as to face each other. In the example shown in FIG. 14, the fifth direction and the seventh direction are orthogonal to each other. Therefore, the seventh direction coincides with the sixth direction, and the eighth direction coincides with the fifth direction.

Among the first to fourth sides 31 to 34 of the magnetism detection element 30, the first side 31 and the second side 32 may extend in the fifth direction in a plan view. The third side 33 and the fourth side 34 may extend in the sixth direction in a plan view. That is, the first side 31 adjacent to the first wiring 91 in a plan view is parallel to the first wiring 91. The second side 32 adjacent to the second wiring 92 in a plan view is parallel to the second wiring 92. The third side 33 adjacent to the third wiring 93 in a plan view is parallel to the third wiring 93. The fourth side 34 adjacent to the fourth wiring 94 in a plan view is parallel to the fourth wiring 94.

Figure 15:
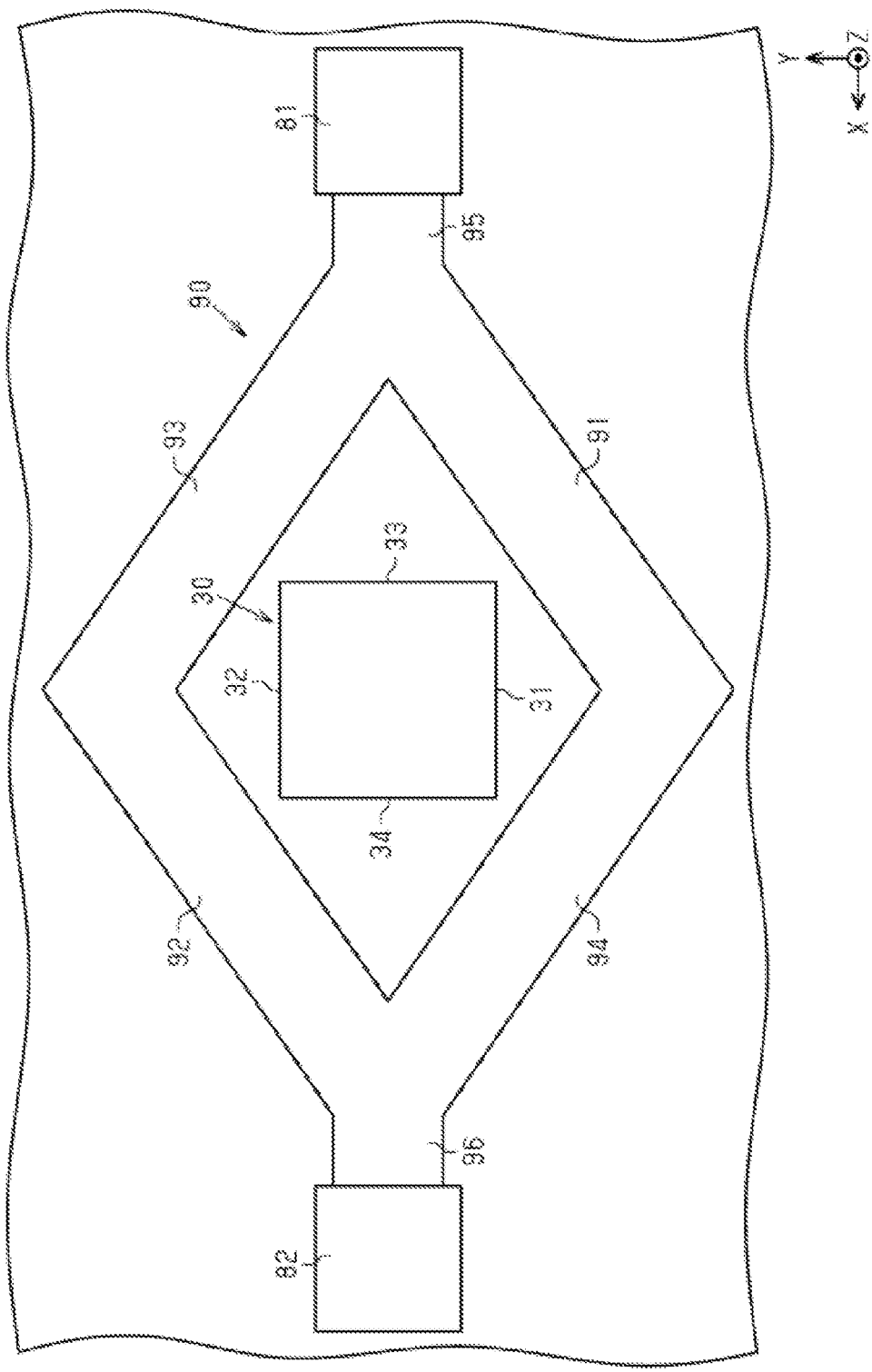
FIG. 15 is an enlarged plan view of a magnetism detection element, a front surface wiring, a first terminal, and a second terminal of a magnetism detection device according to a modification.

As shown in FIG. 15, the first to fourth sides 31 to 34 of the magnetism detection element 30 may not be parallel to the first wiring 91, the second wiring 92, the third wiring 93, and the fourth wiring 94. In an example shown in FIG. 15, the sixth direction, which is an arrangement direction of the first wiring 91 and the second wiring 92, and the eighth direction, which is an arrangement direction of the third wiring 93 and the fourth wiring 94, intersect with each other but are not orthogonal to each other in a plan view. Therefore, the fifth direction and the seventh direction also intersect with each other but are not orthogonal to each other.

Figure 16:
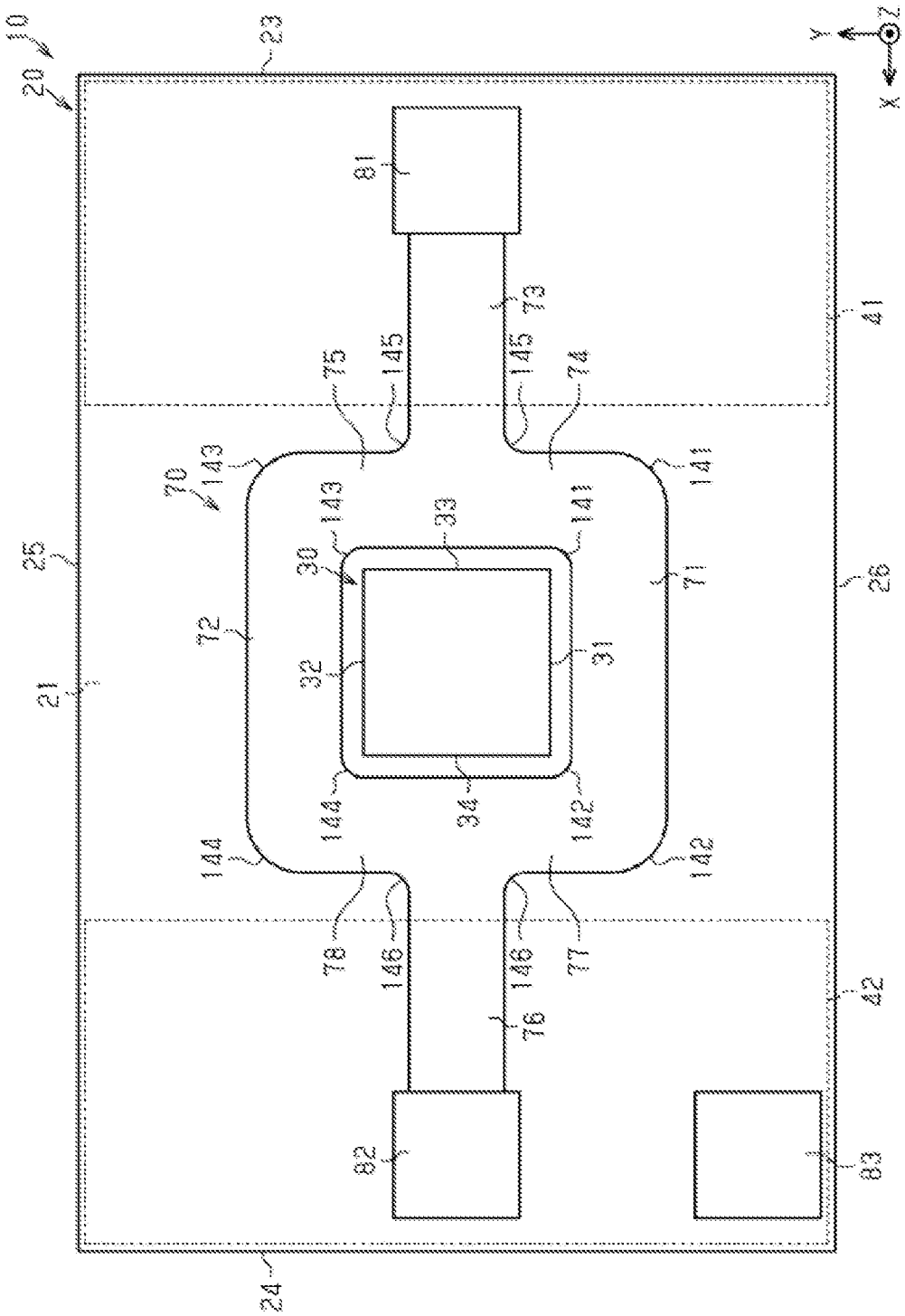
FIG. 16 is a schematic plan view of a magnetism detection device according to a modification.

In the first and fourth embodiments, the front surface wiring 70 may be modified as shown in FIG. 16. Specifically, a curved portion 141 is formed at a connection portion between the first wiring 71 and the first branch wiring 74. A curved portion 142 is formed at a connection portion between the first wiring 71 and the third branch wiring 77. A curved portion 143 is formed at a connection portion between the second wiring 72 and the second branch wiring 75. A curved portion 144 is formed at a connection portion between the second wiring 72 and the fourth branch wiring 78.

Further, a curved portion 145 is formed at a connection portion between the first connection wiring 73 on one hand and the first branch wiring 74 and the second branch wiring 75 on the other hand. A curved portion 146 is formed at a connection portion between the second connection wiring 76 on one hand and the third branch wiring 77 and the fourth branch wiring 78 on the other hand.

Figure 17:
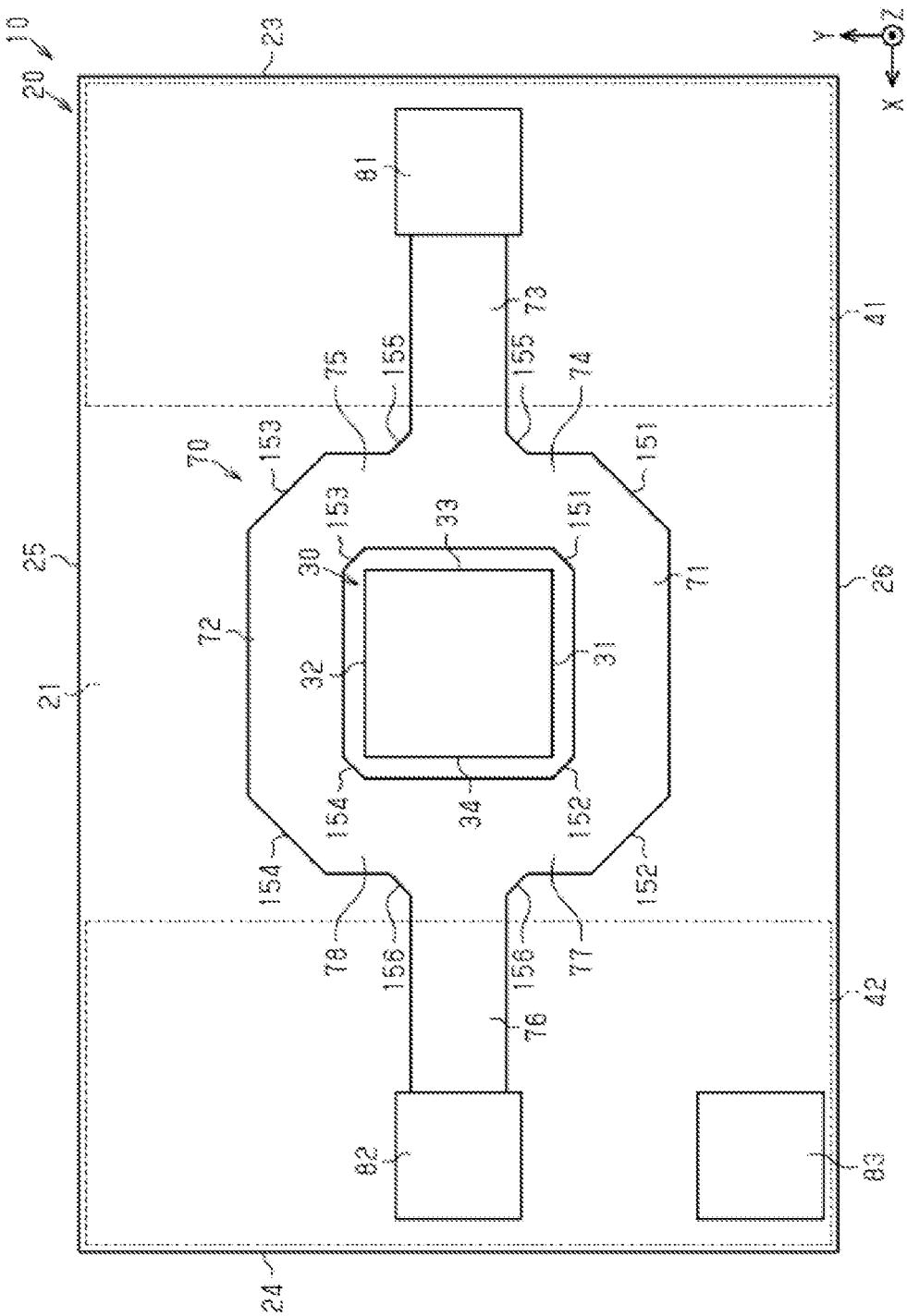
FIG. 17 is a schematic plan view of a magnetism detection device according to a modification.

In the first and fourth embodiments, the front surface wiring 70 may be modified as shown in FIG. 17. Specifically, an inclined portion 151 is formed at the connection portion between the first wiring 71 and the first branch wiring 74. An inclined portion 152 is formed at the connection portion between the first wiring 71 and the third branch wiring 77. An inclined portion 153 is formed at the connection portion between the second wiring 72 and the second branch wiring 75. An inclined portion 154 is formed at the connection portion between the second wiring 72 and the fourth branch wiring 78.

Further, an inclined portion 155 is formed at the connection portion between the first connection wiring 73 on one hand and the first branch wiring 74 and the second branch wiring 75 on the other hand. An inclined portion 156 is formed at the connection portion between the second connection wiring 76 on one hand and the third branch wiring 77 and the fourth branch wiring 78 on the other hand.

Further, in the front surface wiring 90 of the second embodiment, a connection portion between the first wiring 91 and the third wiring 93, a connection portion between the first wiring 91 and the fourth wiring 94, a connection portion between the second wiring 92 and the third wiring 93, and a connection portion between the second wiring 92 and the fourth wiring 94 may be modified in the same manner. Further, in the front surface wiring 90, a connection portion between the first connection wiring 95 and the third wiring 93 and a connection portion between the second connection wiring 96 and the fourth wiring 94 may be modified in the same manner.

Further, in the front surface wiring 100 of the third embodiment, a connection portion between the first wiring 101 and the first end connection part 103, a connection portion between the first wiring 101 and the second end connection part 104, a connection portion between the second wiring 102 and the third end connection part 105, and a connection portion between the second wiring 102 and the fourth end connection part 106 may be modified in the same manner.

In the first and fourth embodiments, the width dimensions W1 and W2 of the first wiring 71 and the second wiring 72 may be different from at least one selected from the group of the width dimensions W4 and W8 of the first branch wiring 74 and the fourth branch wiring 78 and the width dimensions W5 and W7 of the second branch wiring 75 and the third branch wiring 77.

In the first and fourth embodiments, the width dimensions W4 and W8 of the first branch wiring 74 and the fourth branch wiring 78 may be different from the width dimensions W5 and W7 of the second branch wiring 75 and the third branch wiring 77.

In the first and fourth embodiments, the width dimension W3 of the first connection wiring 73 may be different from the width dimension W1 of the first wiring 71 and the width dimension W2 of the second wiring 72. In an example, the width dimension W3 of the first connection wiring 73 may be larger than both the width dimension W1 of the first wiring 71 and the width dimension W2 of the second wiring 72.

In the first and fourth embodiments, the width dimension W1 of the first wiring 71 and the width dimension W2 of the second wiring 72 may be different from each other.

In the first and fourth embodiments, the width dimension W4 of the first branch wiring 74 and the width dimension W8 of the fourth branch wiring 78 may be different from each other.

In the first and fourth embodiments, the width dimension W5 of the second branch wiring 75 and the width dimension W7 of the third branch wiring 77 may be different from each other.

In the first and fourth embodiments, the width dimensions W3 and W6 of the first connection wiring 73 and the second connection wiring 76 are equal to or larger than the width dimension of each of the wirings 71, 72, 74, 75, 77, and 78.

In the first and fourth embodiments, the distance D1 between the first wiring 71 and the magnetism detection element 30 in the Y direction and the distance D2 between the second wiring 72 and the magnetism detection element 30 in the Y direction may be different from each other.

In the first and fourth embodiments, the distance D4 between the first branch wiring 74 and the magnetism detection element 30 in the X direction and the distance D8 between the fourth branch wiring 78 and the magnetism detection element 30 in the X direction may be different from each other.

In the first and fourth embodiments, the distance D5 between the second branch wiring 75 and the magnetism detection element 30 in the X direction and the distance D7 between the third branch wiring 77 and the magnetism detection element 30 in the X direction may be different from each other.

In the second embodiment, the width dimension WA3 of the first connection wiring 95 may be different from the width dimension WA1 of the first wiring 91 and the width dimension WA2 of the second wiring 92. In an example, the width dimension WA3 of the first connection wiring 95 may be larger than both the width dimension WA1 of the first wiring 91 and the width dimension WA2 of the second wiring 92.

In the second embodiment, the width dimensions WA1 and WA2 of the first wiring 91 and the second wiring 92 and the width dimensions WA3 and WA4 of the third wiring 93 and the fourth wiring 94 may be different from each other.

In the second embodiment, the width dimension WA1 of the first wiring 91 and the width dimension WA2 of the second wiring 92 may be different from each other.

In the second embodiment, the width dimension WA3 of the third wiring 93 and the width dimension WA4 of the fourth wiring 94 may be different from each other.

In the second embodiment, the distance DA1 between the first wiring 91 and the magnetism detection element 30 in the Y direction and the distance DA2 between the second wiring 92 and the magnetism detection element 30 in the Y direction may be different from each other.

In the second embodiment, the distance DA3 between the third wiring 93 and the magnetism detection element 30 in the X direction and the distance DA4 between the fourth wiring 94 and the magnetism detection element 30 in the X direction may be different from each other.

In the first and second embodiments, arrangement positions of the first terminal 81 and the second terminal 82 may be arbitrarily modified. In an example, the first terminal 81 and the second terminal 82 may be arranged in a distributed manner with respect to the magnetism detection element 30 in the Y direction. In this case, the first connection wiring 73 (95) extends, for example, in a direction intersecting with or orthogonal to the first wiring 71 (91) in a plan view. The second connection wiring 76 (96) extends, for example, in a direction intersecting with or orthogonal to the second wiring 72 (92) in a plan view.

In the third embodiment, the width dimension WB1 of the first wiring 101 and the width dimension WB2 of the second wiring 102 may be different from each other.

In the third embodiment, the distance DB1 between the first wiring 101 and the magnetism detection element 30 in the Y direction and the distance DB2 between the second wiring 102 and the magnetism detection element 30 in the Y direction may be different from each other.

In the fourth embodiment, the shape of the front surface wiring 130 in a plan view may be modified arbitrarily. In an example, the shape of the front surface wiring 130 in a plan view may be the shape of the front surface wiring 90 in the second embodiment. In this case, arrangement positions of the first terminal 81 and the second terminal 82 are the same as the arrangement positions of the first terminal 81 and the second terminal 82 in the second embodiment. In an example, the shape of the front surface wiring 130 in a plan view may be the shape of the front surface wiring 100 in the third embodiment.

In the first to third embodiments, the protection element 42 may be omitted.

In the first to third embodiments, the driver element 41 may be omitted. In this case, the first terminal 81 is electrically connected to the first wirings 71, 91, and 101 by contacts. The contacts penetrate the wiring insulating film 61 of the wiring layer 60 in the Z direction. The contacts are in contact with both the first terminal 81 and the first wirings 71, 91, and 101.

In each embodiment, the third terminal 83 may be omitted.

One or more of the various examples described in the present disclosure may be combined unless technically contradictory.

The term "on" as used in the present disclosure includes meanings of "on" and "above" unless clearly stated otherwise in the context. Therefore, an expression "a first element is mounted on a second element" is intended to mean that in some embodiments, the first element may be directly arranged on the second element in contact with the second element, while in other embodiments, the first element may be arranged above the second element without contacting the second element. That is, the term "on" does not exclude a structure in which other elements are formed between the first element and the second element.

Supplementary Notes

The technical concepts that may be grasped from the above-described embodiments and modifications are described below. Reference numerals of components of the embodiments corresponding to the components described in supplementary notes are shown in parentheses. The reference numerals are provided as examples to aid understanding, and the components described in supplementary notes should not be limited to the components indicated by the reference numerals.

Supplementary Note 1

A magnetism detection device (10) including:
a substrate (20) having a substrate front surface (21);
a magnetism detection element (30) provided at the substrate front surface (21);
a first terminal (81) and a second terminal (82) arranged at positions on the substrate front surface (21) separated from the magnetism detection element (30); and
a front surface wiring (70) formed over the substrate front surface (21) and configured to electrically connect the first terminal (81) and the second terminal (82),
wherein the front surface wiring (70) includes:
a first wiring (71) configured to apply a magnetic field including a first direction component (MZ1) along a thickness direction (Z direction) of the substrate (20) to the magnetism detection element (30) when a current flows from the first terminal (81) to the second terminal (82); and
a second wiring (72) configured to apply a magnetic field including a second direction component (MZ2), which is in an opposite direction of the first direction component (MZ1), to the magnetism detection element (30) when the current flows from the first terminal (81) to the second terminal (82).

Supplementary Note 2

The magnetism detection device of Supplementary Note 1, wherein the first wiring (71) and the second wiring (72) are arranged on both sides of the magnetism detection element (30) so as to face each other.

Supplementary Note 3

The magnetism detection device of Supplementary Note 2, wherein the first terminal (81) and the second terminal (82) are arranged in a distributed manner on both sides of the magnetism detection element (30) in a third direction (X direction), and
wherein the first wiring (71) and the second wiring (72) are arranged on both sides of the magnetism detection element (30) so as to face each other in a fourth direction (Y direction) orthogonal to the third direction (X direction) when viewed from the thickness direction (Z direction) of the substrate (20).

Supplementary Note 4

The magnetism detection device of Supplementary Note 3, wherein when viewed from the thickness direction (Z direction) of the substrate (20), a distance (D1) between the first wiring (71) and the magnetism detection element (30) in the fourth direction (Y direction) is equal to a distance (D2) between the second wiring (72) and the magnetism detection element (30) in the fourth direction (Y direction).

Supplementary Note 5

The magnetism detection device of any one of Supplementary Notes 1 to 4, wherein a width dimension (W1) of the first wiring (71) and a width dimension (W2) of the second wiring (72) are equal to each other.

Supplementary Note 6

The magnetism detection device of any one of Supplementary Notes 1 to 5, wherein the front surface wiring (70) includes:
a first connection wiring (73) electrically connected to the first terminal (81);
a second connection wiring (76) electrically connected to the second terminal (82);
a first branch wiring (74) that branches from the first connection wiring (73) and is connected to the first wiring (71);
a second branch wiring (75) that branches from the first connection wiring (73) and is connected to the second wiring (72);
a third branch wiring (77) that branches from the second connection wiring (76) and is connected to the first wiring (71); and
a fourth branch wiring (78) that branches from the second connection wiring (76) and is connected to the second wiring (72).

Supplementary Note 7

The magnetism detection device of Supplementary Note 6, further including: a transistor (41) configured to control a current which is supplied from the first terminal (81) to the front surface wiring (70),
wherein the first terminal (81) and the first connection wiring (73) are electrically connected via the transistor (41).

Supplementary Note 8

The magnetism detection device of Supplementary Note 6 or 7, wherein when viewed from the thickness direction (Z direction) of the substrate (20), the first wiring (71), the second wiring (72), the first branch wiring (74), the second branch wiring (75), the third branch wiring (77), and the fourth branch wiring (78) are formed to entirely surround a circumference of the magnetism detection element (30).

Supplementary Note 9

The magnetism detection device of any one of Supplementary Notes 6 to 8, wherein a width dimension (W4) of the first branch wiring (74) and a width dimension (W8) of the fourth branch wiring (78) are equal to each other.

Supplementary Note 10

The magnetism detection device of any one of Supplementary Notes 6 to 9, wherein a width dimension (W5) of the second branch wiring (75) and a width dimension (W7) of the third branch wiring (77) are equal to each other.

Supplementary Note 11

The magnetism detection device of any one of Supplementary Notes 6 to 10, wherein the first branch wiring (74) and the second branch wiring (75) as well as the third branch wiring (77) and the fourth branch wiring (78) are respectively arranged on both sides of the magnetism detection element (30) in the third direction (X direction) such that the first branch wiring (74) and the second branch wiring (75) face the third branch wiring (77) and the fourth branch wiring (78), when viewed from the thickness direction (Z direction) of the substrate (20),
  wherein the first wiring (71) and the second wiring (72) are arranged on both sides of the magnetism detection element (30) so as to face each other in a fourth direction (Y direction) orthogonal to the third direction (X direction) when viewed from the thickness direction (Z direction) of the substrate (20), and
  wherein each of a distance (D4) between the first branch wiring (74) and the magnetism detection element (30) in the third direction (X direction), a distance (D5) between the second branch wiring (75) and the magnetism detection element (30) in the third direction (X direction), a distance (D7) between the third branch wiring (77) and the magnetism detection element (30) in the third direction (X direction), and a distance (D8) between the fourth branch wiring (78) and the magnetism detection element (30) in the third direction (X direction) is larger than both of a distance (D1) between the first wiring (71) and the magnetism detection element (30) in the fourth direction (Y direction) and a distance (D2) between the second wiring (72) and the magnetism detection element (30) in the fourth direction (Y direction).

Supplementary Note 12

The magnetism detection device of any one of Supplementary Notes 6 to 10, wherein the first branch wiring (74) and the second branch wiring (75) as well as the third branch wiring (77) and the fourth branch wiring (78) are arranged on both sides of the magnetism detection element (30) in the third direction (X direction) such that the first branch wiring (74) and the second branch wiring (75) face the third branch wiring (77) and the fourth branch wiring (78), when viewed from the thickness direction (Z direction) of the substrate (20),
  wherein the first wiring (71) and the second wiring (72) are arranged on both sides of the magnetism detection element (30) so as to face each other in a fourth direction (Y direction) orthogonal to the third direction (X direction) when viewed from the thickness direction (Z direction) of the substrate (20), and
  wherein each of a distance (D4) between the first branch wiring (74) and the magnetism detection element (30) in the third direction (X direction), a distance (D5) between the second branch wiring (75) and the magnetism detection element (30) in the third direction (X direction), a distance (D7) between the third branch wiring (77) and the magnetism detection element (30) in the third direction (X direction), and a distance (D8) between the fourth branch wiring (78) and the magnetism detection element (30) in the third direction (X direction) is smaller than both of a distance (D1) between the first wiring (71) and the magnetism detection element (30) in the fourth direction (Y direction) and a distance (D2) between the second wiring (72) and the magnetism detection element (30) in the fourth direction (Y direction).

Supplementary Note 13

The magnetism detection device of any one of Supplementary Notes 1 to 5, wherein the front surface wiring (90) includes:

a third wiring (93) configured to apply a magnetic field including the first direction component (MZ1) or the second direction component (MZ2) to the magnetism detection element (30) when a current flows from the first terminal (81) to the second terminal (82); and
a fourth wiring (94) configured to apply a magnetic field, which is in an opposite direction of the first direction component (MZ1) or the second direction component (MZ2) included in the magnetic field of the third wiring (93) applied to the magnetism detection element (30), to the magnetism detection element (30) when the current flows from the first terminal (81) to the second terminal (82), and
wherein both the third wiring (93) and the fourth wiring (94) extend in a direction different from a direction in which both the first wiring (91) and the second wiring (92) extend when viewed from the thickness direction (Z direction) of the substrate (20).

Supplementary Note 14

The magnetism detection device of Supplementary Note 13, wherein the third wiring (93) connects first ends (91A, 92A) of both the first wiring (91) and the second wiring (92),
  wherein the fourth wiring (94) connects second ends (91B, 92B) of both the first wiring (91) and the second wiring (92), and
  wherein the front surface wiring (90) includes:
  a first connection wiring (95) electrically connected to the first terminal (81) and connected to the first end (91A) of the first wiring (91); and
  a second connection wiring (96) electrically connected to the second terminal (82) and connected to the second end (92B) of the second wiring (92).

Supplementary Note 15

The magnetism detection device of Supplementary Note 13 or 14, wherein when viewed from the thickness direction (Z direction) of the substrate (20), the first wiring (91), the second wiring (92), the third wiring (93), and the fourth wiring (94) are formed to entirely surround a circumference of the magnetism detection element (30).

Supplementary Note 16

The magnetism detection device of any one of Supplementary Notes 13 to 15, wherein the first terminal (81) and the second terminal (82) are arranged in a distributed manner on both sides of the magnetism detection element (30) in the third direction (X direction),
  wherein the first wiring (91) and the second wiring (92) are arranged on both sides of the magnetism detection element (30) so as to face each other in a fourth direction (Y direction) orthogonal to the third direction (X direction) when viewed from the thickness direction (Z direction) of the substrate (20), and
  wherein the third wiring (93) and the fourth wiring (94) are arranged on both sides of the magnetism detection element (30) so as to face each other in the third direction (X direction) when viewed from the thickness direction (Z direction) of the substrate (20).

Supplementary Note 17

The magnetism detection device of Supplementary Note 16, wherein a distance (DA1) between the first wiring (91)

and the magnetism detection element (30) in the fourth direction (Y direction) is equal to a distance (DA2) between the second wiring (92) and the magnetism detection element (30) in the fourth direction (Y direction), and wherein a distance (DA3) between the third wiring (93) and the magnetism detection element (30) in the third direction (X direction) is equal to a distance (DA4) between the fourth wiring (94) and the magnetism detection element (30) in the third direction (X direction).

Supplementary Note 18

The magnetism detection device of any one of Supplementary Notes 13 to 17, wherein a width dimension (WA3) of the third wiring (93) and a width dimension (WA4) of the fourth wiring (94) are equal to each other.

Supplementary Note 19

The magnetism detection device of any one of Supplementary Notes 1 to 18, wherein the substrate (20) is a semiconductor substrate, wherein an insulating layer (50) is formed over the substrate front surface (21), wherein the magnetism detection element (30) is provided at the semiconductor substrate (20), and wherein the front surface wiring (70) is formed over the insulating layer (50).

Supplementary Note 20

The magnetism detection device of any one of Supplementary Notes 1 to 18, wherein the magnetism detection element (30) is formed as a semiconductor chip and is mounted on the substrate front surface (21).

Supplementary Note 21

The magnetism detection device of Supplementary Note 16 or 17, wherein the distance (DA3) between the third wiring (93) and the magnetism detection element (30) in the third direction (X direction) is equal to the distance (DA4) between the fourth wiring (94) and the magnetism detection element (30) in the third direction (X direction).

Supplementary Note 22

The magnetism detection device of any one of Supplementary Notes 6 to 10, wherein the first branch wiring (74) and the second branch wiring (75) as well as the third branch wiring (77) and the fourth branch wiring (78) are respectively arranged on both sides of the magnetism detection element (30) in the third direction (X direction) such that the first branch wiring (74) and the second branch wiring (75) face the third branch wiring (77) and the fourth branch wiring (78), when viewed from the thickness direction (Z direction) of the substrate (20), wherein the first wiring (71) and the second wiring (72) are arranged on both sides of the magnetism detection element (30) so as to face each other in the fourth direction (Y direction) orthogonal to the third direction (X direction) when viewed from the thickness direction (Z direction) of the substrate (20), and wherein a distance (D4) between the first branch wiring (74) and the magnetism detection element (30) in the third direction (X direction) is equal to a distance (D8) between the fourth branch wiring (78) and the magnetism detection element (30) in the third direction (X direction).

Supplementary Note 23

The magnetism detection device of any one of Supplementary Notes 6 to 10, wherein the first branch wiring (74) and the second branch wiring (75) as well as the third branch wiring (77) and the fourth branch wiring (78) are respectively arranged on both sides of the magnetism detection element (30) in the third direction (X direction) such that the first branch wiring (74) and the second branch wiring (75) face the third branch wiring (77) and the fourth branch wiring (78) when viewed from the thickness direction (Z direction) of the substrate (20), wherein the first wiring (71) and the second wiring (72) are arranged on both sides of the magnetism detection element (30) in the fourth direction (Y direction) orthogonal to the third direction (X direction) so as to face each other when viewed from the thickness direction (Z direction) of the substrate (20), and wherein a distance (D5) between the second branch wiring (75) and the magnetism detection element (30) in the third direction (X direction) is equal to a distance (D7) between the third branch wiring (77) and the magnetism detection element (30) in the third direction (X direction).

Supplementary Note 24

The magnetism detection device of any one of Supplementary Notes 1 to 10, wherein the first wiring (71) and the second wiring (72) are parallel to each other when viewed from the thickness direction (Z direction) of the substrate (20).

Supplementary Note 25

The magnetism detection device of any one of Supplementary Notes 6 to 10, wherein the first branch wiring (74) and the fourth branch wiring (78) are parallel to each other when viewed from the thickness direction (Z direction) of the substrate (20).

Supplementary Note 26

The magnetism detection device of any one of Supplementary Notes 6 to 10, wherein the second branch wiring (75) and the third branch wiring (77) are parallel to each other when viewed from the thickness direction (Z direction) of the substrate (20).

Supplementary Note 27

The magnetism detection device of any one of Supplementary Notes 12 to 15, wherein the third wiring (93) and the fourth wiring (94) are parallel to each other when viewed from the thickness direction (Z direction) of the substrate (20).

Supplementary Note 28

The magnetism detection device of any one of Supplementary Notes 1 to 19, wherein both the first wiring (71) and the second wiring (72) are arranged at the same position in the thickness direction (Z direction) of the substrate (20) and are arranged in different positions from the magnetism detection element (30) in the thickness direction (Z direction).

Supplementary Note 29

The magnetism detection device of any one of Supplementary Notes 6 to 12, wherein both the first branch wiring (74) and the fourth branch wiring (78) are arranged at the same position in the thickness direction (Z direction) of the substrate (20) and are arranged in different positions from the magnetism detection element (30) in the thickness direction (Z direction).

Supplementary Note 30

The magnetism detection device of any one of Supplementary Notes 6 to 12, wherein both the second branch wiring (75) and the third branch wiring (77) are arranged at the same position in the thickness direction (Z direction) of the substrate (20) and are arranged in different positions from the magnetism detection element (30) in the thickness direction (Z direction).

Supplementary Note 31

The magnetism detection device of any one of Supplementary Notes 13 to 18, wherein both the third wiring (93) and the fourth wiring (94) are arranged at the same position in the thickness direction (Z direction) of the substrate (20) and are arranged in different positions from the magnetism detection element (30) in the thickness direction (Z direction).

The above description is merely an example. Those skilled in the art will appreciate that more combinations and substitutions may be conceived beyond the components and methods (manufacturing processes) listed for illustrating the techniques of the present disclosure. The present disclosure is intended to cover all alternatives, modifications, and changes that fall within the scope of the present disclosure, including the claims.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A magnetism detection device comprising:
   a substrate having a substrate front surface;
   a magnetism detection element provided at the substrate front surface;
   a first terminal and a second terminal arranged at positions on the substrate front surface separated from the magnetism detection element; and
   a front surface wiring formed over the substrate front surface and configured to electrically connect the first terminal and the second terminal,
   wherein the front surface wiring includes:
      a first wiring configured to apply a magnetic field including a first direction component along a thickness direction of the substrate to the magnetism detection element when a current flows from the first terminal to the second terminal; and
      a second wiring configured to apply a magnetic field including a second direction component, which is in an opposite direction of the first direction component, to the magnetism detection element when the current flows from the first terminal to the second terminal.

2. The magnetism detection device of claim 1, wherein the first wiring and the second wiring are arranged on both sides of the magnetism detection element so as to face each other.

3. The magnetism detection device of claim 2, wherein the first terminal and the second terminal are arranged in a distributed manner on both sides of the magnetism detection element in a third direction, and
   wherein the first wiring and the second wiring are arranged on both sides of the magnetism detection element so as to face each other in a fourth direction orthogonal to the third direction when viewed from the thickness direction of the substrate.

4. The magnetism detection device of claim 3, wherein when viewed from the thickness direction of the substrate, a distance between the first wiring and the magnetism detection element in the fourth direction is equal to a distance between the second wiring and the magnetism detection element in the fourth direction.

5. The magnetism detection device of claim 1, wherein a width dimension of the first wiring and a width dimension of the second wiring are equal to each other.

6. The magnetism detection device of claim 1, wherein the front surface wiring includes:
   a first connection wiring electrically connected to the first terminal;
   a second connection wiring electrically connected to the second terminal;
   a first branch wiring that branches from the first connection wiring and is connected to the first wiring;
   a second branch wiring that branches from the first connection wiring and is connected to the second wiring;
   a third branch wiring that branches from the second connection wiring and is connected to the first wiring; and
   a fourth branch wiring that branches from the second connection wiring and is connected to the second wiring.

7. The magnetism detection device of claim 6, further comprising: a transistor configured to control a current which is supplied from the first terminal to the front surface wiring,
   wherein the first terminal and the first connection wiring are electrically connected via the transistor.

8. The magnetism detection device of claim 6, wherein when viewed from the thickness direction of the substrate, the first wiring, the second wiring, the first branch wiring, the second branch wiring, the third branch wiring, and the fourth branch wiring are formed to entirely surround a circumference of the magnetism detection element.

9. The magnetism detection device of claim 6, wherein a width dimension of the first branch wiring and a width dimension of the fourth branch wiring are equal to each other.

10. The magnetism detection device of claim 6, wherein a width dimension of the second branch wiring and a width dimension of the third branch wiring are equal to each other.

11. The magnetism detection device of claim 6, wherein the first branch wiring and the second branch wiring as well as the third branch wiring and the fourth branch wiring are respectively arranged on both sides of the magnetism detection element in a third direction such that the first branch wiring and the second branch wiring face the third branch wiring and the fourth branch wiring, when viewed from the thickness direction of the substrate, wherein the first wiring and the second wiring are arranged on both sides of the magnetism detection element so as to face each other in a fourth direction orthogonal to the third direction when viewed from the thickness direction of the substrate, and wherein each of a distance between the first branch wiring and the magnetism detection element in the third direction, a distance between the second branch wiring and the magnetism detection element in the third direction, a distance between the third branch wiring and the magnetism detection element in the third direction, and a distance between the fourth branch wiring and the magnetism detection element in the third direction is larger than both of a distance between the first wiring and the magnetism detection element in the fourth direction and a distance between the second wiring and the magnetism detection element in the fourth direction.

12. The magnetism detection device of claim 6, wherein the first branch wiring and the second branch wiring as well as the third branch wiring and the fourth branch wiring are respectively arranged on both sides of the magnetism detection element in a third direction such that the first branch wiring and the second branch wiring face the third branch wiring and the fourth branch wiring, when viewed from the thickness direction of the substrate, wherein the first wiring and the second wiring are arranged on both sides of the magnetism detection element so as to face each other in a fourth direction orthogonal to the third direction when viewed from the thickness direction of the substrate, and wherein each of a distance between the first branch wiring and the magnetism detection element in the third direction, a distance between the second branch wiring and the magnetism detection element in the third direction, a distance between the third branch wiring and the magnetism detection element in the third direction, and a distance between the fourth branch wiring and the magnetism detection element in the third direction is smaller than both of a distance between the first wiring and the magnetism detection element in the fourth direction and a distance between the second wiring and the magnetism detection element in the fourth direction.

13. The magnetism detection device of claim 1, wherein the front surface wiring includes:

a third wiring configured to apply a magnetic field including the first direction component or the second direction component to the magnetism detection element when the current flows from the first terminal to the second terminal; and a fourth wiring configured to apply a magnetic field, which is in an opposite direction of the first direction component or the second direction component included in the magnetic field of the third wiring applied to the magnetism detection element, to the magnetism detection element when the current flows from the first terminal to the second terminal, wherein both the third wiring and the fourth wiring extend in a direction different from a direction in which both the first wiring and the second wiring extend when viewed from the thickness direction of the substrate.

14. The magnetism detection device of claim 13, wherein the third wiring connects first ends of both the first wiring and the second wiring, wherein the fourth wiring connects second ends of both the first wiring and the second wiring, and wherein the front surface wiring includes:

a first connection wiring electrically connected to the first terminal and connected to the first end of the first wiring; and a second connection wiring electrically connected to the second terminal and connected to the second end of the second wiring.

15. The magnetism detection device of claim 13, wherein when viewed from the thickness direction of the substrate, the first wiring, the second wiring, the third wiring, and the fourth wiring are formed to entirely surround a circumference of the magnetism detection element.

16. The magnetism detection device of claim 13, wherein the first terminal and the second terminal are arranged in a distributed manner on both sides of the magnetism detection element in a third direction, wherein the first wiring and the second wiring are arranged on both sides of the magnetism detection element so as to face each other in a fourth direction orthogonal to the third direction when viewed from the thickness direction of the substrate, and wherein the third wiring and the fourth wiring are arranged on both sides of the magnetism detection element so as to face each other in the third direction when viewed from the thickness direction of the substrate.

17. The magnetism detection device of claim 16, wherein a distance between the first wiring and the magnetism detection element in the fourth direction is equal to a distance between the second wiring and the magnetism detection element in the fourth direction, and wherein a distance between the third wiring and the magnetism detection element in the third direction is equal to a distance between the fourth wiring and the magnetism detection element in the third direction.

18. The magnetism detection device of claim 13, wherein a width dimension of the third wiring and a width dimension of the fourth wiring are equal to each other.

19. The magnetism detection device of claim 1, wherein the substrate is a semiconductor substrate, wherein an insulating layer is formed over the substrate front surface, wherein the magnetism detection element is provided at the semiconductor substrate, and wherein the front surface wiring is formed over the insulating layer.

20. The magnetism detection device of claim 1, wherein the magnetism detection element is formed as a semiconductor chip and is mounted on the substrate front surface.

* * * * *